United States Patent
Fotopoulos et al.

(10) Patent No.: US 9,507,472 B2
(45) Date of Patent: Nov. 29, 2016

(54) HYBRID CAPACITIVE BASELINE MANAGEMENT

(71) Applicant: Synaptics Incorporated, San Jose, CA (US)

(72) Inventors: Nickolas Fotopoulos, San Jose, CA (US); Joseph Kurth Reynolds, Alviso, CA (US); Tom Vandermeijden, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 14 days.

(21) Appl. No.: 14/327,530

(22) Filed: Jul. 9, 2014

(65) Prior Publication Data

US 2015/0015539 A1    Jan. 15, 2015

Related U.S. Application Data

(63) Continuation-in-part of application No. 14/041,531, filed on Sep. 30, 2013.

(60) Provisional application No. 61/844,801, filed on Jul. 10, 2013, provisional application No. 61/928,963, filed on Jan. 17, 2014.

(51) Int. Cl.
*G06F 3/044* (2006.01)
*G06F 3/041* (2006.01)

(52) U.S. Cl.
CPC ............. *G06F 3/044* (2013.01); *G06F 3/0416* (2013.01)

(58) Field of Classification Search
CPC .............................. G06F 3/044; G06F 3/0416
See application file for complete search history.

(56) References Cited

U.S. PATENT DOCUMENTS

| | | |
|---|---|---|
| 5,841,078 A | 11/1998 | Miller et al. |
| 5,945,980 A | 8/1999 | Moissev et al. |
| 7,337,085 B2 | 2/2008 | Soss |
| 7,864,160 B2 | 1/2011 | Geaghan et al. |
| 7,911,456 B2 | 3/2011 | Gillespie et al. |
| 7,920,129 B2 | 4/2011 | Hotelling et al. |
| 7,986,313 B2 | 7/2011 | Krah |
| 8,054,300 B2 | 11/2011 | Bernstein |
| 8,094,128 B2 | 1/2012 | Vu et al. |

(Continued)

FOREIGN PATENT DOCUMENTS

KR    1020130035885 A    4/2013

OTHER PUBLICATIONS

Office Action, U.S. Appl. No. 14/041,531, mailed Mar. 4, 2015, 30 pages.

(Continued)

*Primary Examiner* — Alexander Eisen
*Assistant Examiner* — Cory Almeida

(57) ABSTRACT

In a method of managing baselines of a capacitive sensing input device, a transcapacitive baseline, a first absolute capacitive baseline, and a second absolute capacitive baseline are acquired with a plurality of sensor electrodes of the capacitive sensing input device. A transcapacitive image, a first absolute capacitive profile, and a second absolute capacitive profile are acquired with the plurality of sensor electrodes. The transcapacitive baseline, the first absolute capacitive baseline, and the second absolute capacitive baseline are managed based on a value of at least one of the first absolute capacitive profile and the second absolute capacitive profile.

18 Claims, 15 Drawing Sheets

(56) References Cited

U.S. PATENT DOCUMENTS

| | | | |
|---|---|---|---|
| 8,125,456 B2 | 2/2012 | Krah et al. | |
| 8,259,076 B2 | 9/2012 | Trent et al. | |
| 8,358,142 B2 | 1/2013 | Maharyta | |
| 8,384,684 B2 | 2/2013 | Westerman | |
| 8,482,544 B2 | 7/2013 | Land et al. | |
| 8,493,355 B2 | 7/2013 | Geaghan et al. | |
| 8,493,359 B2 | 7/2013 | Wright et al. | |
| 8,508,495 B2 | 8/2013 | Hotelling et al. | |
| 8,692,802 B1 | 4/2014 | Maharyta et al. | |
| 8,773,146 B1 * | 7/2014 | Hills | G01N 27/22 324/658 |
| 8,810,542 B2 | 8/2014 | Yousefpor | |
| 8,836,669 B1 | 9/2014 | Ogirko et al. | |
| 2005/0156881 A1 | 7/2005 | Trent, Jr. et al. | |
| 2006/0244733 A1 | 11/2006 | Geaghan | |
| 2006/0293864 A1 * | 12/2006 | Soss | G06F 3/0418 702/104 |
| 2007/0074914 A1 | 4/2007 | Geaghan et al. | |
| 2007/0247443 A1 | 10/2007 | Philipp | |
| 2008/0048997 A1 | 2/2008 | Gillespie et al. | |
| 2008/0157782 A1 | 7/2008 | Krah | |
| 2008/0158172 A1 | 7/2008 | Hotelling et al. | |
| 2008/0158183 A1 | 7/2008 | Hotelling et al. | |
| 2008/0162996 A1 | 7/2008 | Krah et al. | |
| 2008/0162997 A1 | 7/2008 | Vu et al. | |
| 2009/0284495 A1 | 11/2009 | Geaghan et al. | |
| 2010/0001973 A1 | 1/2010 | Hotelling et al. | |
| 2010/0060608 A1 | 3/2010 | Yousefpor | |
| 2010/0164889 A1 | 7/2010 | Hristov et al. | |
| 2010/0245286 A1 | 9/2010 | Parker | |
| 2010/0292945 A1 | 11/2010 | Reynolds et al. | |
| 2011/0006832 A1 | 1/2011 | Land et al. | |
| 2011/0025629 A1 | 2/2011 | Grivna et al. | |
| 2011/0061949 A1 | 3/2011 | Krah et al. | |
| 2011/0080365 A1 | 4/2011 | Westerman | |
| 2012/0043971 A1 | 2/2012 | Maharyta | |
| 2012/0068949 A1 | 3/2012 | Washburn et al. | |
| 2012/0081335 A1 | 4/2012 | Land et al. | |
| 2012/0229418 A1 | 9/2012 | Schwartz et al. | |
| 2012/0310572 A1 | 12/2012 | Jordan | |
| 2013/0176271 A1 | 7/2013 | Sobel et al. | |
| 2013/0229382 A1 | 9/2013 | Huang et al. | |
| 2013/0234985 A1 | 9/2013 | Huang | |
| 2013/0257767 A1 | 10/2013 | Wu et al. | |
| 2013/0257797 A1 | 10/2013 | Wu et al. | |
| 2013/0328823 A1 * | 12/2013 | Liu | G06F 3/0418 345/174 |
| 2014/0184552 A1 * | 7/2014 | Tanemura | G06F 3/044 345/174 |
| 2014/0327644 A1 | 11/2014 | Mohindra | |
| 2015/0009168 A1 | 1/2015 | Levesque et al. | |
| 2015/0015528 A1 | 1/2015 | Vandermeijden | |

OTHER PUBLICATIONS

ISA/KR, International Search Report and Written Opinion for International Application # PCT/US2014/046054, pp. 1-10, mailed Oct. 27, 2014.

* cited by examiner

900

ACQUIRING A TRANSCAPACITIVE IMAGE, A FIRST ABSOLUTE CAPACITIVE PROFILE, AND A SECOND ABSOLUTE CAPACITIVE PROFILE WITH A PLURALITY OF SENSOR ELECTRODES
910

DETERMINING AN ABSOLUTE CAPACITIVE IMAGE AS A FUNCTION OF THE FIRST ABSOLUTE CAPACITIVE PROFILE AND THE SECOND ABSOLUTE CAPACITIVE PROFILE
920

DETERMINING A HYBRID CAPACITIVE IMAGE AS A FUNCTION OF THE ABSOLUTE CAPACITIVE IMAGE AND THE TRANSCAPACITIVE IMAGE
930

ACQUIRING A TRANSCAPACITIVE IMAGE, A FIRST ABSOLUTE CAPACITIVE PROFILE, AND A SECOND ABSOLUTE CAPACITIVE PROFILE WITH A PLURALITY OF SENSOR ELECTRODES
1010

DETERMINING AN HYBRID CAPACITIVE IMAGE ON A PER-PIXEL BASIS AS A FUNCTION OF THE FIRST ABSOLUTE CAPACITIVE PROFILE, THE SECOND ABSOLUTE CAPACITIVE PROFILE, AND THE TRANSCAPACITIVE IMAGE
1020

```
ACQUIRING A TRANSCAPACITIVE BASELINE, A FIRST ABSOLUTE
CAPACITIVE BASELINE, AND A SECOND ABSOLUTE CAPACITIVE
BASELINE WITH A PLURALITY OF SENSOR ELECTRODES
1110
          ↓
ACQUIRING A TRANSCAPACITIVE IMAGE, A FIRST ABSOLUTE
CAPACITIVE PROFILE, AND A SECOND ABSOLUTE CAPACITIVE
PROFILE WITH THE PLURALITY OF SENSOR ELECTRODES
1120
          ↓
MANAGING THE TRANSCAPACITIVE BASELINE, THE FIRST
ABSOLUTE CAPACITIVE BASELINE, AND THE SECOND ABSOLUTE
CAPACITIVE BASELINE BASED ON A VALUE OF AT LEAST ONE OF
THE FIRST ABSOLUTE CAPACITIVE PROFILE AND THE SECOND
ABSOLUTE CAPACITIVE PROFILE
1130
```

FIG. 11A

HYBRID CAPACITIVE BASELINE MANAGEMENT

CROSS-REFERENCE TO RELATED U.S. APPLICATIONS (PROVISIONAL)

This application claims priority to and benefit of co-pending U.S. Provisional Patent Application No. 61/844,801 filed on Jul. 10, 2013 entitled "HYBRID CAPACITIVE IMAGE DETERMINATION AND USE," by Tom Vandermeijden, and assigned to the assignee of the present application.

This application claims priority to and benefit of co-pending U.S. Provisional Patent Application No. 61/928,963, filed on Jan. 17, 2014, entitled "HYBRID CAPACITIVE BASELINE MANAGEMENT," by Tom Vandermeijden et al., and assigned to the assignee of the present application.

CROSS-REFERENCE TO RELATED U.S. APPLICATION (CONTINUATION-IN-PART)

This application is a continuation-in-part application of and claims the benefit of co-pending U.S. patent application Ser. No. 14/041,531 filed on Sep. 30, 2013, entitled "HYBRID CAPACITIVE IMAGE DETERMINATION AND USE," by Tom Vandermeijden, and assigned to the assignee of the present application.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger electronic systems (such as opaque touchpads integrated in, or peripheral to, notebook or desktop computers). Proximity sensor devices are also often used in smaller electronic systems (such as touch screens integrated in cellular phones and tablet computers). Such touch screen input devices are typically superimposed upon or otherwise collocated with a display of the electronic system.

SUMMARY

In a method of determining a hybrid capacitive image a transcapacitive image, a first absolute capacitive profile, and a second absolute capacitive profile are acquired with a plurality of sensor electrodes. An absolute capacitive image is determined as a function of the first absolute capacitive profile and the second absolute capacitive profile. A hybrid capacitive image is determined as a function of the absolute capacitive image and the transcapacitive image.

In a method of managing baselines of a capacitive sensing input device a transcapacitive baseline, a first absolute capacitive baseline, and a second absolute capacitive baseline are acquired with a plurality of sensor electrodes of the capacitive sensing input device. A transcapacitive image, a first absolute capacitive profile, and a second absolute capacitive profile are acquired with the plurality of sensor electrodes. The transcapacitive baseline, the first absolute capacitive baseline, and the second absolute capacitive baseline are managed based on a value of at least one of the first absolute capacitive profile and the second absolute capacitive profile.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements.

FIGS. 9A and 9B show a flow diagram of an example method of determining a hybrid capacitive image, according to various embodiments.

FIGS. 10A and 10B show a flow diagram of an example method of determining a hybrid capacitive image, according to various embodiments.

FIGS. 11A and 11B show a flow diagram of an example method of managing baselines of a capacitive sensing input device, according to various embodiments.

DESCRIPTION OF EMBODIMENTS

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive proximity sensor device.

Some embodiments describe determination and use of hybrid capacitive images. In one embodiment, a hybrid capacitive image is utilized for determining input object interactions with a proximity sensor device, which may in turn be a portion of a touch screen input device of an electronic device/system. As will be further discussed, in some embodiments, use of hybrid absolute capacitive/transcapacitive images (i.e., "hybrid capacitive images") facilitates input object detection and position determination with respect to a variety of input objects to include detection and position determination of a single gloved human digit interacting with an input device and/or multiple gloved human digits in a multi-touch interaction with an input device. As will be described below, a hybrid capacitive image is determined from a combination of absolute capacitive sensing and transcapacitive sensing.

Some embodiments describe managing transcapacitive and absolute capacitive baselines of associated with a set of sensor electrodes of a capacitive sensing input device. In some embodiments, as part of this management, results from various techniques described herein can be used to determine whether to freeze, reacquire, fast relax, or slow relax transcapacitive and absolute capacitive baselines acquired by and associated with a capacitive sensing region of a capacitive sensing input device.

Discussion begins with a description of an example input device with which or upon which various embodiments described herein may be implemented. An example sensor electrode pattern is then described. This is followed by description of some example processing systems and some components thereof. The processing systems may be utilized with an input device, such as a capacitive sensing device. Various procedures involved with a determination of an example hybrid capacitive image are described in conjunction with examples of: capacitive profiles, absolute capacitive images, and a transcapacitive image. Operation of a capacitive input device, processing system, and components thereof are then further described in conjunction with description of a method of determining a hybrid capacitive image and in conjunction with a method of managing baselines of a capacitive sensing input device.

Example Input Device

Figure 1:
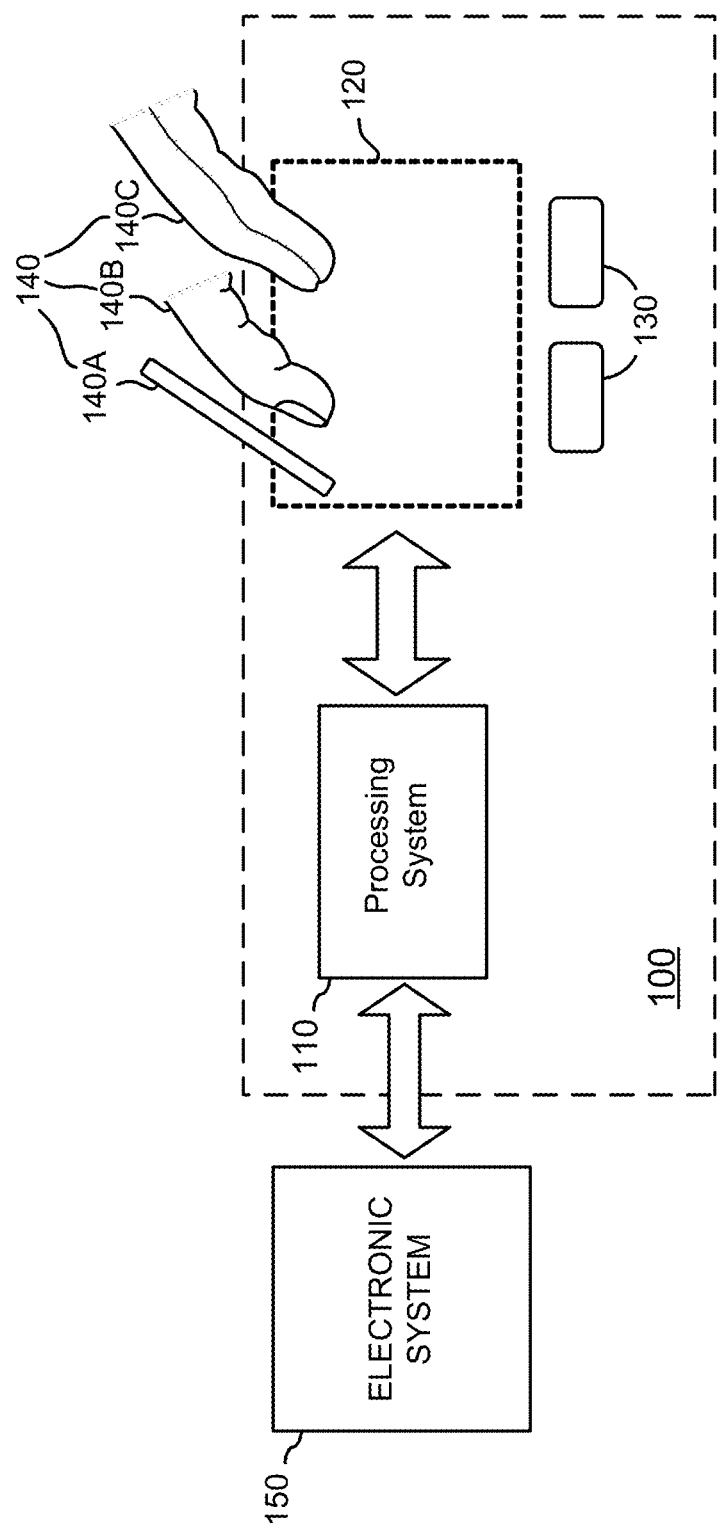
FIG. 1 is a block diagram of an example input device, in accordance with various embodiments.

Turning now to the figures, FIG. 1 is a block diagram of an exemplary input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device" or a "touch screen input device" when combined with a display) configured to sense input provided by one or more input objects 140 in a sensing region 120. Some example input objects 140 include styli 140A, human digits 140B, and gloved human digits 140C, as shown in FIG. 1. In one embodiment, a gloved human digit 140C includes a finger, thumb, or toe which is covered by a glove such as a cold weather glove, driving glove, flying glove or other glove which includes one or more layers of natural and/or synthetic material that separate the human digit from both the environment and from actual physical contact between the skin of the digit and an input device.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as proximate sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other tangible storage technology.

Example Sensor Electrode Pattern

Figure 2:
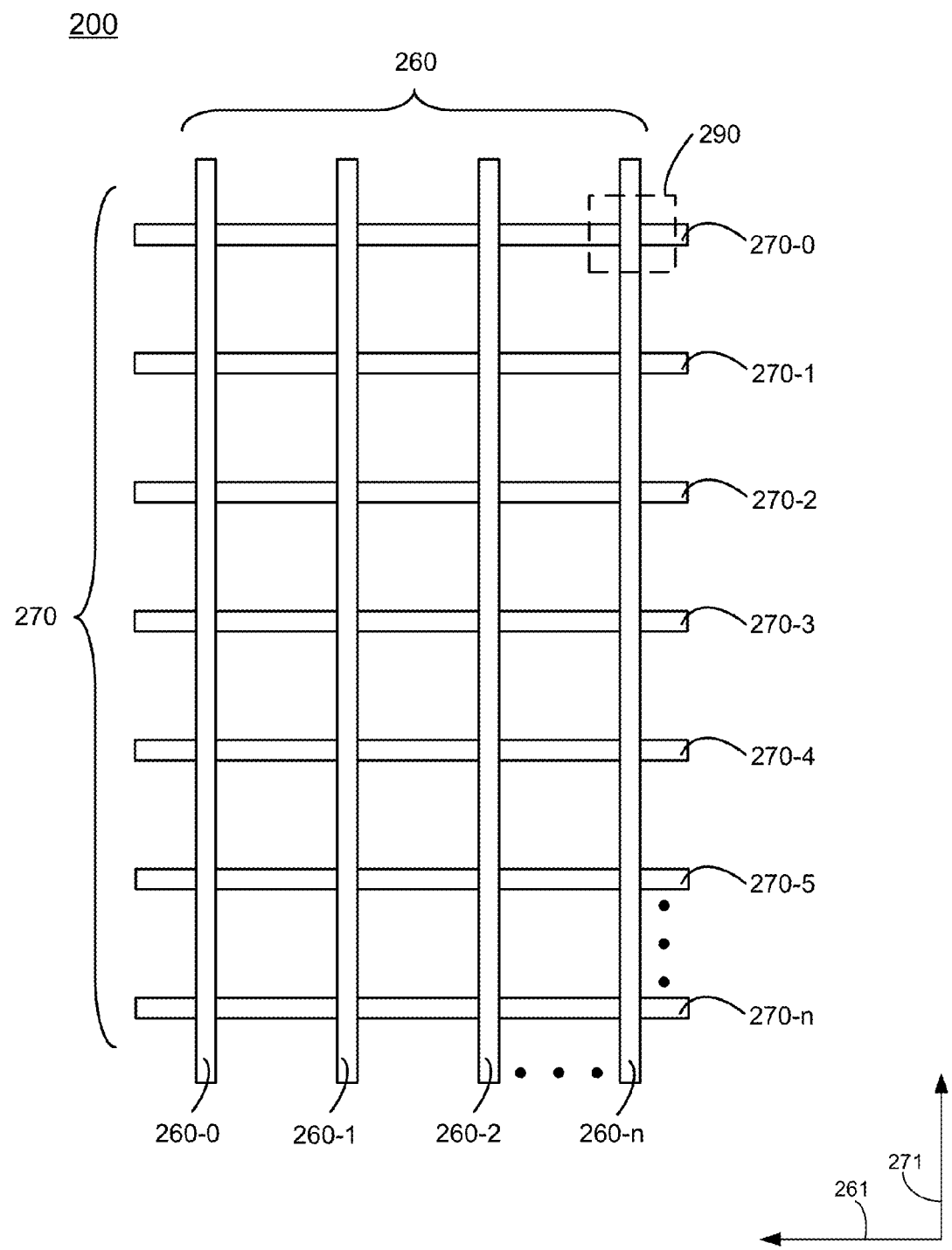
FIG. 2 shows a portion of an example sensor electrode pattern which may be utilized in a sensor to generate all or part of the sensing region of an input device, such as a touch screen, according to some embodiments.

FIG. 2 shows a portion of an example sensor electrode pattern 200 which may be utilized in a sensor to generate all or part of the sensing region of a input device 100, according to various embodiments. Input device 100 is configured as a capacitive input device when utilized with a capacitive sensor electrode pattern. For purposes of clarity of illustration and description, a non-limiting simple crossing sensor electrode pattern 200 with rectangular sensor electrodes is illustrated. Although depicted as rectangular in sensor electrode pattern 200, in other embodiments the sensor electrodes of a capacitive sensing pattern could have any shape. Additionally, in various embodiments, some sensor electrodes may be longer or shorter than others and some or all sensor electrodes may be the same length. It is appreciated that numerous other sensor electrode patterns may be employed including, but not limited to, patterns with two sets of sensor electrodes disposed in a single layer (with or without overlapping), and patterns that provide individual zero dimensional electrodes. The illustrated sensor electrode pattern is made up of a first plurality of sensor electrodes 260 (260-0, 260-1, 260-2 . . . 260-n) and a second plurality of sensor electrodes 270 (270-0, 270-1, 270-2, 270-3, 270-4 . . . 270-n) which overlay one another, in this example. In some embodiments, the number of sensor electrodes in the first plurality of sensor electrodes 260 may be equal to or different than number of sensor electrodes in the second plurality of sensor electrodes 270. In the illustrated example, sensor electrodes 260 are arrayed along a first axis 261 while sensor electrodes 270 are arrayed along a second axis 271. Although axes 261 and 271 are illustrated as being orthogonal with respect to one another, in some embodiments, the sensor electrodes 260 and sensor electrodes 270 may be arrayed along two axes that are not orthogonal with respect to one another. In the illustrated example, capacitive sensing pixels are centered at locations where sensor electrodes of the first and second pluralities cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate (not shown) is typically disposed between sensor electrodes 260 and sensor electrodes 270. However, in some embodiments, sensor electrodes 260 and sensor electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between sensor electrodes 260 and sensor electrodes 270. The capacitive coupling between sensor electrodes 260 and sensor electrodes 270 changes with the proximity and motion of input objects in the sensing region associated with sensor electrodes 260 and sensor electrodes 270.

In some embodiments, sensor electrode pattern 200 is "scanned" to determine these capacitive couplings. That is, the sensor electrodes 260 are driven to transmit transmitter signals, and in such a configuration, may be referred to as transmitter electrodes Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of sensor electrodes 270 to be independently determined.

The sensor electrodes 270 may be operated singly or multiply to acquire resulting signals, and in such a configuration, may be referred to as receiver electrodes. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 or 270 may be operated to perform absolute capacitive sensing at a particular instance of time. For example, sensor electrode 270-0 may be charged and then the capacitance of sensor electrode 270-0 may be measured. In such an embodiment, an input object 140 interacting with sensor electrode 270-0 alters the electric field proximate sensor electrode 270-0, thus changing the measured capacitive coupling. In this same manner, any one of or a plurality of sensor electrodes 270 may be used to measure absolute capacitance and/or any one of or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode." Measurements of absolute capacitance with a first plurality of sensor electrodes (e.g., 260-0 through 260-$n$ in some embodiments) arrayed along a first axis can be used to create a first absolute capacitive profile or other representation of absolute capacitance with respect to that first axis. Measurements of absolute capacitance with a second plurality of sensor electrodes (e.g., 270-0 through 270-$n$ in some embodiments) arrayed along a second axis can be used to create a second absolute capacitive profile or other representation of absolute capacitance with respect to that second axis.

Example Processing Systems

Figure 3A:
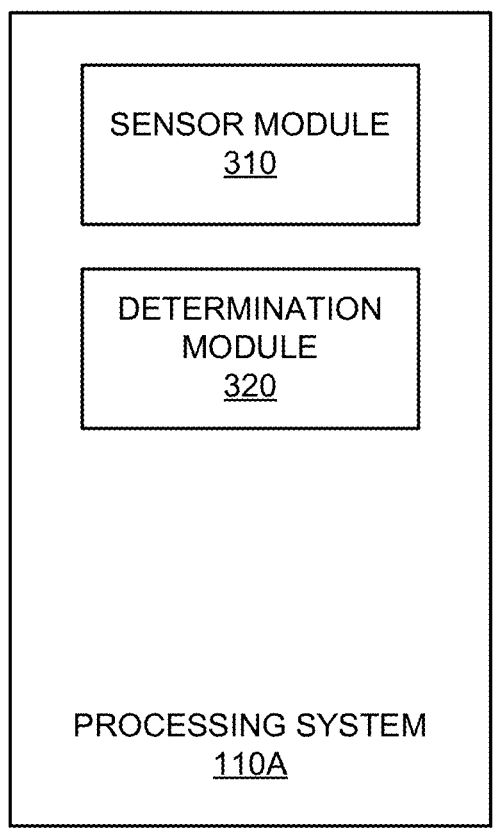
FIG. 3A shows a processing system, according to various embodiments.

FIG. 3A illustrates a block diagram of some components of an example processing system 110A that may be utilized with an input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more sensor electrodes of a first and second plurality that implement a sensing region 120 of an input device 100. In some embodiments, processing system 110A and the input device 100, of which it is a part, may be disposed in or communicatively coupled with an electronic system 150, such as a display device, computer, or other electronic system.

In one embodiment, processing system 110A includes, among other components: sensor module 310 and determination module 320. Processing system 110A and/or components thereof may be coupled with sensor electrodes of a sensor electrode pattern, such as sensor electrode pattern 200, among others. For example, sensor module 310 is coupled with one or more sensor electrodes of a sensor electrode pattern (e.g., sensor electrode pattern 200) of input device 100.

Sensor module 310 comprises sensor circuitry and operates to interact with the first and/or second plurality sensor electrodes of a sensor pattern that is utilized to generate a sensing region 120. This includes operating a first plurality of sensor electrodes to be silent, to transmit a transmitter signal, to be used for transcapacitive sensing, and/or to be driven with a modulated signal to be used for absolute capacitive sensing. This includes operating a second plurality of sensor electrodes to be silent, to transmit a transmitter signal, to be used for transcapacitive sensing, and/or to be driven with a modulated signal to be used for absolute capacitive sensing. This also includes utilizing receiver sensor electrodes to receive resulting signals and other signals which may be interference.

Sensor module 310 operates to transmit transmitter signals on one or more sensor electrodes of a first plurality of sensor electrodes (e.g., one or more of sensor electrodes 260). In a given time interval, sensor module 310 may transmit or not transmit a transmitter signal (waveform) on one or more of the plurality of sensor electrodes. Sensor module 310 may also be utilized to couple one or more of the firth plurality of sensor electrodes (and respective transmitter path(s)) of a plurality of the first plurality of sensor electrodes) to high impedance, ground, or to a constant voltage when not transmitting a waveform on such sensor electrodes. The transmitter signal may be a square wave, trapezoidal wave, or some other waveform. Sensor module 310 may code a transmitter signal, such as in a code division multiplexing scheme.

Sensor module 310 also operates to receive resulting signals, via a second plurality of sensor electrodes (e.g., one or more of sensor electrodes 270) during transcapacitive sensing. The received resulting signals correspond to and include effects corresponding to the transmitter signal(s) transmitted via the a first plurality of sensor electrodes. These transmitted transmitter signals however, may be altered or changed in the resulting signal due to stray capacitance, noise, interference, and/or circuit imperfections among other factors, and thus may differ slightly or greatly from their transmitted versions. Sensor module 310 also operates to receive resulting signals from a first and/or second plurality of sensor electrodes when operating absolute capacitive sensing is performed. It should be appreciated that when performing absolute capacitive sensing, a sensor electrode which is driven with a modulated signal becomes modulated, and the resulting signal is received or measured from the same sensor electrode. A modulated signal for absolute capacitive sensing can be the same waveform and frequency as the transmitter signal used for transcapacitive sensing (amplitude may differ) or the signals for absolute capacitive sensing and transcapacitive sensing can be different in any one or more of frequency, phase, shape, and amplitude. Resulting signals may be received on one or a plurality of sensor electrodes during a time interval. Sensor module 310 includes a plurality of amplifiers. Such amplifiers may be referred to herein as amplifiers, front-end amplifiers, integrating amplifiers, or the like, and receive a resulting signal at an input. The resulting signal is from a sensor electrode of a capacitive sensor device.

Determination module 320 operates to compute/determine a measurement of a change in a transcapacitive capacitive coupling between a first and second sensor electrode during transcapacitive sensing. Determination module 320 also operates to compute/determine a measurement of absolute capacitive coupling to a sensor electrode. Determination module 320 then uses such measurements to determine the positional information comprising the position of an input object (if any) with respect to sensing region 120. The positional information determination can be done from absolute capacitive profiles, transcapacitive images, and/or hybrid transcapacitive/absolute capacitive images (i.e., "hybrid capacitive images") any of which is determined/calculated by determination module 320 based upon signals from sensor module 310. Determination module 320 may be implemented as hardware (e.g., hardware logic and/or other circuitry) and/or as a combination of hardware and instructions stored in a non-transitory manner in a computer readable storage medium.

In some embodiments, processing system 110A comprises decision making logic which directs one or more portions of processing system 110A, such as sensor module 310 and/or determination module 320, to operate in a selected one of a plurality of different operating modes based on various inputs. Some non-limiting examples of such modes: include normal power mode; low power mode (where less power is used for sensing than in the normal power mode); transcapacitive sensing mode (where only transcapacitive sensing is performed); absolute capacitive sensing mode (where only absolute capacitive sensing is performed; and hybrid capacitive sensing mode (where a combination of absolute capacitive sensing and transcapacitive sensing are preformed). Some non-limiting examples of such inputs include one or more measurement(s) of interference, indication of an input being sensed or not sensed in sensing region 120 of input device 100, difficulty in determining position of one or more input objects. In some embodiments, processing system 110A may direct operation in an absolute capacitive sensing mode when it is desired to detect hovering objects; direct operation in transcapacitive sensing mode when it is desired to detect contacting input objects that are known not to be gloved human digits; and direct operation in hybrid capacitive sensing mode it is desired to detect contacting input objects that include gloved human digits. In some embodiments, processing system 110A may also direct sensor module 310 and determination module 320 to perform sensing on only a sub-portion of a sensing region 120 by either sensing on a sub-portion of a set of sensor electrodes (260, 270) in a sensor electrode pattern or by only determining certain results such as a hybrid capacitive image for certain sub-portions by processing data sensed by sensor electrodes in the targeted sub-portion. For example, in an embodiment where a single input object is identified in a set of absolute capacitive profiles, processing system 110A may direct the determination of a hybrid capacitive image for only the sub portion of a sensing region 120 and associate sensor electrodes of a sensor electrode pattern where the single input object is determined as being positioned.

In various embodiments, processing system 110A utilizes a hybrid capacitive to determine whether or not a baseline image (baseline) comprises certain errors. For example, an error in a baseline image may arise when an input object is in the sensing region at the time when the baseline image is acquired such that the response due to the input object is captured within the baseline image. When such a baseline image is compared to acquired capacitive measurements by processing system 110A, negative values may occur in regions corresponding to where the response due to the input object was captured in the baseline image. A baseline image may additionally or alternatively comprise other errors which may arise due to internal or external interference, temperature changes and/or changes to the sensor electrodes.

In various embodiments, in forming the hybrid image, the absolute capacitance corresponding to a sensor electrode and the summed (or projected) changes in transcapacitance along that sensor electrode may be compared by processing system 110A. For example, for a sensor electrode that is configured to perform as a receiver electrode to detect changes in transcapacitance, each measured change in transcapacitance between that senor electrode and each sensor electrode configured as a transmitter electrode may be summed by processing system 110A, thus creating a summed transcapacitance value. In other embodiments, the changes in transcapacitance between a sensor electrode configured as a transmitter and each sensor electrode configured as a receiver electrode may also be summed by processing system 110A, thus creating a summed transcapacitance value for that transmitter electrode. Processing system 110A may then compare the summed transcapacitance values with the absolute capacitance value from that sensor electrode. If the two values correlate, for example if they are both positive values, then processing system 110A may consider the baseline image may to be a good/valid baseline image. If the two values do not correlate, for example if the one value is nearly zero and the other is a negative value or positive value, then processing system 110A may consider the baseline image to be bad/invalid. Processing system 110A may then acquire a new baseline image or apply other correction means such as fast or slow relaxation processes.

Figure 3B:
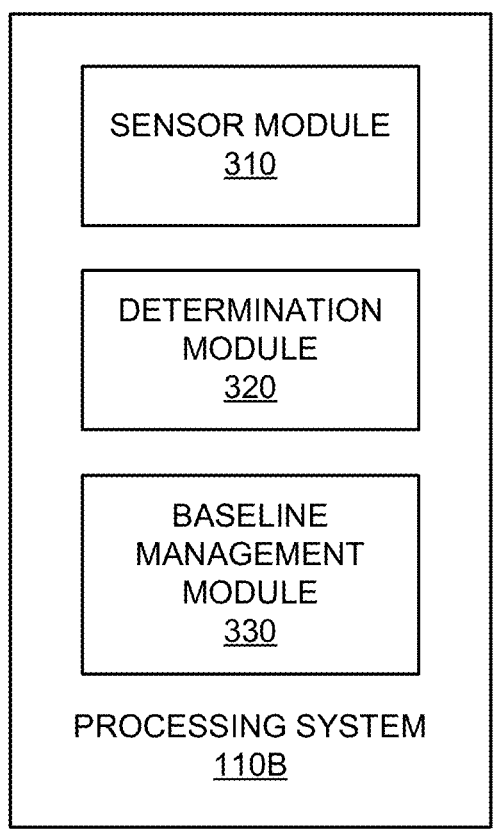
FIG. 3B shows a processing system, according to various embodiments.

FIG. 3B illustrates a block diagram of some components of an example processing system 110B that may be utilized with an input device (e.g., in place of processing system 110 as part of input device 100), according to various embodiments. Processing system 110B may be implemented with one or more Application Specific Integrated Circuits (ASICSs), one or more Integrated Circuits (ICs), one or more controllers, or some combination thereof. In one embodiment, processing system 110B is communicatively coupled with one or more sensor electrodes of a first and second plurality that implement a sensing region 120 of an input device 100. In some embodiments, processing system 110B and the input device 100, of which it is a part, may be disposed in or communicatively coupled with an electronic system 150, such as a display device, computer, or other electronic system.

In one embodiment, processing system 110B includes, among other components: sensor module 310, determination module 320, and baseline management module 330. Processing system 110B and/or components thereof may be coupled with sensor electrodes of a sensor electrode pattern, such as sensor electrode pattern 200, among others. For example, sensor module 310 is coupled with one or more sensor electrodes of a sensor electrode pattern (e.g., sensor electrode pattern 200) of input device 100.

Sensor module 310 operates in the consistent with the manner previously described in conjunction with processing system 110A.

Determination module 320 operates consistent with the manner previously described in conjunction with processing system 110A.

In various embodiments, processing system 110B acquires and maintains a baseline frame ("baseline") corresponding to a transcapacitive sensing mode ("transcapacitive baseline") and a baseline frame corresponding to an absolute capacitive sensing mode ("absolute capacitive baseline"). The absolute capacitance may comprise one or more different absolute capacitive baselines, where each of the absolute capacitive baselines corresponds to a different absolute capacitance profile of the input device. For example, a first absolute capacitive baseline corresponding first absolute capacitive profile and be associated with a first set of sensor electrodes disposed along a first axis (e.g., axis 261) while a second absolute capacitive baseline and corresponding second absolute capacitive profile is associated with a second set of sensor electrodes disposed along an axis (e.g., axis 271) that is orthogonal to the first set of sensor electrodes. Processing system 110B may utilize a hybrid capacitance to determine whether or not a baseline comprises certain errors. Further, processing system 110B may be configured to update or acquire a new baseline corresponding to one of or both sensing modes.

In one embodiment, baseline management module 330 operates to manage baselines that are acquired by input device 100. For example, an error in a baseline may arise when an input object is in the sensing region at the time when at least one of the baselines is acquired such that the response due to the input object is captured within at least one of the baselines. When such a baseline is compared to acquired capacitive measurements by processing system 110B, negative values may occur in regions corresponding to where a response due to the input object was captured in the baseline for an input object that was removed from the sensing region when the acquired capacitive measurements where acquired. One or both of baselines may additionally or alternatively comprise other errors which may arise due to internal or external interference, temperature changes and/or changes to the sensor electrodes. In such embodiments, at least one of the changes in absolute capacitance and changes in transcapacitance may be used to determine when and/or how to update either or both baselines or when to acquire a new baseline for at least one of the sensing modes. In some embodiments baseline management module 330 directs acquisition of absolute capacitive and transcapacitive baselines upon startup of a device. In some embodiments, baseline management module 330 additionally or alternatively directs acquisition of new absolute capacitive and transcapacitive baselines as a management action in response to detection of a baseline error.

In one or more embodiments, any action applied to any baseline is also applied to the other baseline(s). For example, when processing system 110B performs a management action with respect to the transcapacitive baseline, processing system 110B it performs the same management action with respect to the the absolute capacitive baseline(s). In various embodiments, managing the baseline comprises performing a baseline management action such as relaxing the baseline (fast or slow relaxation), acquiring a new baseline, freezing the baseline, and similar actions. In one or more embodiments, relaxing the baseline comprises changing over a time period, increasing or decreasing, values within the baseline that are different than the preliminary values of the baseline, such that the values are realigned with the preliminary values. In one embodiment, fast relaxation occurs over a shorter time period than that of slow relaxation. Fast relaxation may be twice as fast as slow relaxation in some embodiments. In other embodiments, fast relaxation may be more than twice as fast as slow relaxation or less than twice as fast as slow relaxation. In some embodiments, slow relaxation is performed in small increments (i.e., one step per frame over subsequent frames), while fast relaxation is performed more quickly (such as at an exponential decay rate over a series of frames). In one embodiment, fast relaxation is an exponential decay from the values in the baseline to the values at corresponding locations in the current frame. Fast relaxation and slow relaxation may be applied to the current baselines values based on the magnitude of the difference between the current baseline values and the preliminary values. In some embodiments, slow relaxation is a default mode, and other updates such as fast relaxation, freezing of baselines, and reacquisition of baselines is directed when errors or inconsistencies are noted by baseline management module 330.

For example, fast relaxation is applied when the magnitude of the difference is found to be above a threshold amount and slow relaxation is applied when the magnitude of the difference is found to be below a threshold amount. In one embodiment, slow relaxation may be applied to the current baseline values to adjust for drift that may be caused by environmental changes and changes in operating conditions. In one embodiment, environmental changes may include, but are not limited to, changes in temperature and humidity. In one embodiment, baseline management module 330 is configured to determine the environmental changes and changes in operating conditions and adjust the corresponding baseline values. In another embodiment, the environmental changes and changes in operating conditions are determined external from processing system 110B, and an indication is sent to the processing system 110 indicating at least one of when and by how much to adjust the corresponding baseline values. In one embodiment, baseline management module 330 directs determination module 320 of processing system 110 to adjust a baseline value in response to drift over time caused by at least one of environmental adjust and changes in operating conditions. In one embodiment slow relaxation may be used to adjust for drift while fast relaxation may be used to adjust for errors in the baseline based on the comparisons described below.

In various embodiments, baseline management module 330 determines a delta between a transcapacitive image and the transcapacitive baseline, a delta between a X-axis absolute capacitive profile and the X-axis absolute capacitive baseline, and a delta between a Y-axis absolute capacitive profile and the Y-axis absolute capacitive baseline. Peak values in the transcapacitive delta should also appear as peak values in both the corresponding locations of the X-axis delta and the Y-axis delta. If the peak values do not appear at corresponding locations in all three, it is indicative of an error. In response to this error, in one embodiment, baseline management module 330 directs processing system 110B to perform fast relaxation of the transcapacitive and absolute capacitive baselines. If there is no error (e.g., the peak values are determined to be present in all three deltas) and at least one of the peak values is also classified as being an input object, in one embodiment, baseline management module 330 directs processing system 110B to freeze the transcapacitive and absolute capacitive baselines while the input object remains detected in subsequent frames. If there is no error (e.g., the peak values are determined to be present in all three deltas) but none of the peak values is classified as being an input object, in one embodiment, baseline management module 330 directs processing system 110B to slow relax the transcapacitive and absolute capacitive baselines. In some embodiments, even if no errors are detected when comparing peaks across the transcapacitive and absolute capacitive deltas additional checks, such as those described below may be conducted and factored in to the management before baseline management module 330 directs processing system 110B to take a baseline management action.

In one or more embodiments, processing system 110B is configured to acquire a first absolute capacitance profile and a second absolute capacitive profile determined from the changes in absolute capacitance of the plurality of sensor electrodes (e.g., X-axis and Y-axis absolute capacitive profiles). In one embodiment, if baseline management module 330 determines that either profile includes a negative value, an error within at least one of the baselines may be determined and all of the baselines (absolute capacitive and transcapacitive baselines) may be adjusted, new baselines may be acquired, or additional checks may be performed. In the above embodiment, under normal operating conditions, the presence of an input object would cause the absolute capacitive profile(s) to have a positive peak; therefore a negative peak (or any negative value) would be indicative of an error within the baseline. However, in various embodiments, the sign of the values may be reversed such that an input object causes a negative value and a positive value would be indicative of an error within the baseline(s). In other embodiments, some negative values may be allowed as long as they are not more negative than a pre-determined threshold or as long as additional testing criteria are satisfied.

In various embodiments, changes in absolute capacitance of the sensor electrodes and changes in transcapacitance of sensor electrode may be compared by baseline management module 330 of processing system 110B. For example, baseline management module 330 may then compare the transcapacitance values with the absolute capacitance values. If the two values correlate, for example if they are both positive (non-negative) values, then baseline management module 330 may consider the baseline images to be a good/valid baseline images. If the two values do not correlate, for example if the one value is nearly zero and the other is a negative value or positive value, then processing system 110B may consider the baseline images to be bad/invalid. Processing system 110B may then acquire a new baseline image or apply other correction means such as fast or slow relaxation processes. In various embodiments, the values of the changes in transcapacitance may be compared against threshold values to determine if an input object is present. Further, the values absolute capacitance are compared against threshold values to determine if an input object is present. If an input object is determined to be present in one, but not the other, an error in the baseline may be determined and new baselines may be acquired or the baselines may be updated.

In one embodiment, to check for negativity (lack of positivity), the values in the absolute capacitive deltas described above are checked to see if there are any negative values at any location for which a delta value is calculated. If so, this indicates an error condition. In one embodiment, as an alternative to checking for any negative values, the negativity check involves a check for net negativity. To check for net negativity (lack of positivity), the values in the deltas described above (e.g., the transcapacitive delta and each of the absolute capacitive deltas) are individually summed. If summation of the transcapacitive delta's values is net negative below a established threshold (which could be as restrictive as any net negative value) it is considered indicative of a baseline error, if either or both of the summations of the absolute deltas' values is net negative at all it may be indicative of a baseline error. In one embodiment, if none of the performed negativity checks or shows an error and an input object is being detected, then freezing of all of the baselines is directed by baseline management module 330. In one embodiment, if none of the performed negativity checks shows an error and no input object is being detected, then slow relaxation of all of the baselines is directed by baseline management module 330. In one embodiment, if one or more of the negativity checks performed shows an error and no input object is being detected, then new acquisition of all of the baselines or fast relaxation of all of the baselines is directed by baseline management module 330 (reacquisition is directed for more severe errors).

In some embodiments, if any of the above described negativity checks that are performed on either or both of the separate absolute capacitive deltas is determined to be indicative a baseline error, an additional check may be performed by baseline management module 330 before directing a baseline management action. In one such embodiment, this additional check may comprise summing the positive values and summing the negative values in each of the absolute capacitive deltas and then analyzing the ratios of the positive to negative summations for each absolute capacitive deltas to determine how negative the ratios are. This ratio test can involve comparison of the calculated ratios to pre-established threshold ratios. Put more mathematically, an error condition is only declared if any value fails the first round of negativity checks and additionally if the ratio of positive sum/negative sum is less than the pre-established ratio against which it is thresholded. If the calculated ratios are more positive than the pre-established ratios, then the earlier error negativity error in the negativity check on the absolute capacitive delta is deemed not to be an error. If either or both of the calculated ratios fail the comparison to the pre-established ratios, then the earlier negativity check on the absolute capacitive delta is deemed to be indicative of an error. In one embodiment, with errors in both the negativity check and ratio checks, baseline management module 330 directs reacquisition of all baselines. In one embodiment, where there is an error in the negativity check but not in the ratio checks, then baseline management module 330 directs slow relaxation of the baselines if no input object is present and no errors were detected in the peak value checks. In one embodiment, where there is an error in the negativity check but not in the ratio checks, then baseline management module 330 directs freezing of the baselines if an input object is present and no errors were detected in the peak value checks.

It should be appreciated that, in various embodiments, the peak value checks and the negativity checks may be performed alone (either the peak value checks or the negativity checks is performed) or in combination with one another. In embodiments where the peak value and negativity checks are performed in combination they may be performed in any order and will not be limited to the order described above. For example, negativity checks may be performed prior to performing peak value checks.

Example of Hybrid Image Determination

FIGS. 4-8 illustrate various stages that are included in some embodiments of determining a hybrid capacitive image. The example provided in FIGS. 4-8 is not intended to be limiting, and thus it should be appreciated that in other embodiments of determining a hybrid capacitive image, some portions discussed in FIGS. 4-8 may be omitted or performed in a different manner and/or that additional procedures may be included.

Figure 4:
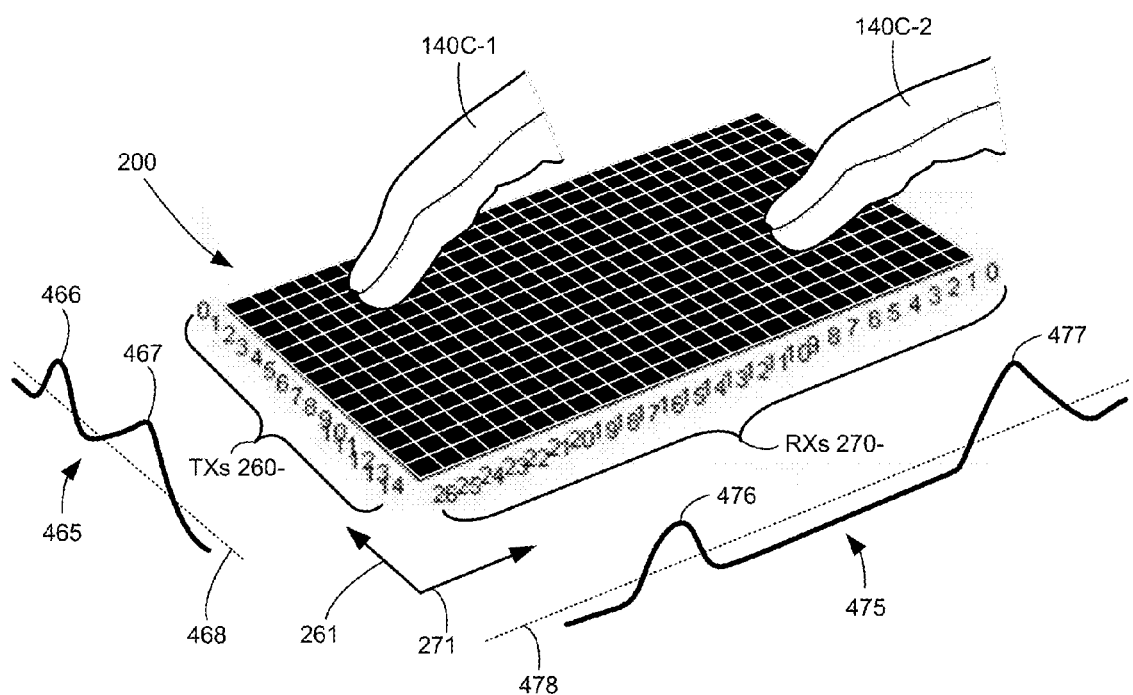
FIG. 4 shows a perspective view of an example pair of absolute capacitive profiles generated in response to input objects interacting with a sensor electrode pattern, according to an embodiment.

FIG. 4 shows a perspective view of an example pair of absolute capacitive profiles 465, 475 generated in response to an arrangement of input objects. In some embodiments profiles 465 and 475 are taken on orthogonal axes; for example, absolute capacitive profile 465 is an x-axis profile in one embodiment and absolute capacitive profile 475 is a y-axis profile in one embodiment. For example, according to various embodiments, the input objects may be styli, ungloved human digits, gloved human digits, other input objects, and/or mixed combinations of different types of input objects, interacting with a sensor electrode pattern. Although two input objects are illustrated, an arrangement of input objects may include a single input object or more than two input objects interacting with a sensor electrode pattern. Such interacting includes one or more input objects touching a capacitive sensing input device and/or being within a sensing region of a capacitive sensing input device without touching the capacitive sensing input device. In general, absolute capacitive profiles and similar representations of absolute capacitance are well known by those skilled in the capacitive sensing arts. In FIG. 4, a pair of gloved human digits, 140C-1 and 140C-2, are depicted for purposes of example and not of limitation to these particular input objects or this type of input object.

In one embodiment, sensor module 310 performs absolute capacitive sensing with sensor electrode pattern 200 and determination module 320 determines a first absolute capacitive measurement. The absolute capacitive measurement may comprise capacitive profile 465 based on absolute capacitive sensing performed with all or some subset of first plurality of sensor electrodes 260 (260-0, 260-1, 260-2, 260-3, 260-4, 260-5, 260-6, 260-7, 260-8, 260-9, 260-10, 260-11, 260-12, 260-13, 260-14). Capacitive profile 465 has a first peak 466 associated with a location of gloved digit 140C-1 along axis 261 and a second peak 467 associated with a location of gloved digit 140C-2 along axis 261. In various embodiments, the first capacitive profile may comprise any representation of absolute capacitive measurements.

In one embodiment, sensor module 310 performs absolute capacitive sensing with sensor electrode pattern 200 and determination module 320 determines a second absolute capacitive measurement. The absolute capacitive measurement may comprise capacitive profile 475 based on absolute capacitive sensing performed with all or some subset of second plurality of sensor electrodes 270 (270-0, 270-1, 270-2, 270-3, 270-4, 270-5, 270-6, 270-7, 270-8, 270-9, 270-10, 270-11, 270-12, 270-13, 270-14, 270-15, 270-16, 270-17, 270-18, 270-19, 270-20, 270-21, 270-22, 270-23, 270-24, 270-25, and 270-26). Capacitive profile 475 has a first peak 476 associated with a location of gloved digit 140C-1 along axis 271 and a second peak 477 associated with a location of gloved digit 140C-2 along axis 271. In various embodiments, the second capacitive profile may comprises any representation of absolute capacitive measurements.

In some embodiments, one or more types of preprocessing may be performed on one or more of the absolute capacitive profiles that have been determined, prior to using the data from those profiles in the generation of an absolute capacitive image. Such preprocessing can be used to accentuate certain data in the profile and/or to eliminate/reduce noise. In some embodiments, for example, weighting may be applied to all or a portion of the data of an absolute capacitive profile; for example, capacitive profile data may be weighted by adding or multiplying it by a factor, squaring it, cubing it, or the like. In one embodiment, when a capacitive profile has multiple peaks data associated with the largest peak may be weighted while data associated with other peaks is not. In some embodiments, for example, thresholding may be applied to all or a portion of the data of an absolute capacitive profile. Thresholding is one example of filtering, and other types of filtering may be employed.

With respect to thresholding, dotted line 468 represents a threshold which may be applied to capacitive profile 465 to cut-off or set to zero any value below this threshold. In the illustrated embodiment, the threshold is set at 30% of the greatest value (e.g., the value of peak 467) measured in capacitive profile 465. In other embodiments, a threshold such as threshold 468 can be set at other values. In one embodiment, for example the threshold may be set between 10% and 50% of the peak value of the capacitive profile. In one embodiment, such thresholding may be applied to capacitive profile 465 prior to using data of capacitive profile 465 to determine an absolute capacitive image. Dotted line 478 represents a threshold which may be applied to capacitive profile 475 to cut-off or set to zero any value below this threshold. In the illustrated embodiment, the threshold is set at 40% of the greatest value (e.g., the value of peak 477) measured in capacitive profile 465. In other embodiments, a threshold such as threshold 478 can be set at other values. In one embodiment, for example the threshold may be set between 10% and 50% of the peak value of the capacitive profile. In one embodiment, such thresholding may be applied to capacitive profile 465 prior to using data of capacitive profile 465 to determine an absolute capacitive image.

Figure 5:
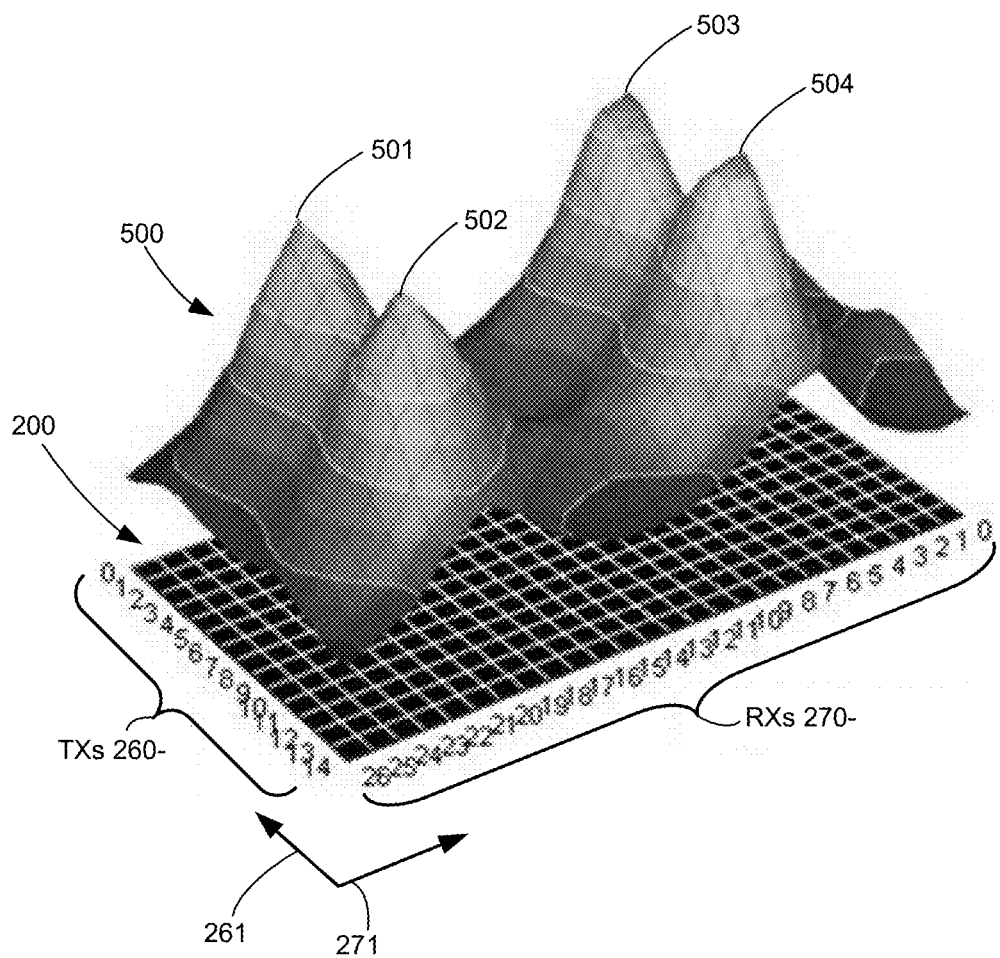
FIG. 5 shows a perspective view of an example absolute capacitive image generated as a function of two absolute capacitive profiles, according to an embodiment.

It should be appreciated that, in various embodiments: thresholding may be applied at the same or different percentage levels to capacitive profiles 465 and 475; that thresholding may be applied to one of capacitive profiles 465 and 475 but not the other; and that thresholding may not be applied at all. In some embodiments, a combination of thresholding, weighting, and/or other techniques may be used to preprocess data of one or more absolute capacitive profiles prior to use of the data in determination of an absolute capacitive image FIG. 5 shows a perspective view of an example absolute capacitive image 500 generated as a function of two absolute capacitive profiles, according to an embodiment. In various embodiments, determination module 320 generates an absolute capacitive image from at the absolute capacitive measurement data along the different axes of the capacitive sensing input device. For example, In one embodiment, determination module 320 generates an absolute capacitive image from at least two absolute capacitive profiles that are along different axes. For example, in one embodiment, determination module 320 generates absolute capacitive image 500 as a function of the data of absolute capacitive profiles 465 and 475. Equation 1 shows one example of a function that may be used to determine/project capacitive pixel values of an absolute capacitive image from two absolute capacitive profiles such as 465 and 475; however, other functions may be used. With respect to Equation 1, in one embodiment, values from absolute capacitive profile 465 provide AbsColumn data and values from absolute capacitive profile 475 provide AbsRow data.

$$AbsImage[x][y]=AbsColumn[x]*AbsRow[y] \qquad \text{Equation 1}$$

When applying Equation 1, any zero value in one or both of capacitive profiles 465 and 475 results in a zero value in the absolute capacitive image (AbsImage); this facilitates noise reduction. Moreover, preprocessing techniques such as thresholding can create additional zero values in profiles by discarding or zeroing out some data in an absolute capacitive profile, thus further suppressing noise. At locations where there is non-zero data in both of capacitive profiles 465 and 475, the multiplying of such non-zero values by Equation 1 accentuates the corresponding capacitive pixel values in the absolute capacitive image (AbsImage). This can be seen in absolute capacitive image 500 which illustrates four peaks 501, 502, 503, and 504. Two of these peaks 501 and 504 represent actual input object interaction from gloved digits 140C-1 and 140C-2, while the other two 502 and 504 represent ghost images. The ghost images occur as a result of diagonal input objects and would not exist for a single input object or non-diagonal input objects (e.g., aligned along either axis 261 or axis 271).

In addition to multiplying data, as described by Equation 1, other techniques may be used for determining an absolute capacitive image comprise. For example, in one embodiment, capacitive pixel values of an absolute capacitive image are determined by a linear combination of the data from a plurality of absolute capacitive profiles using an equation such as Equation 2.

$$\text{AbsImage}[x][y] = \text{AbsColumn}[x] + \text{AbsRow}[y] \quad \text{Equation 2}$$

Figure 6:
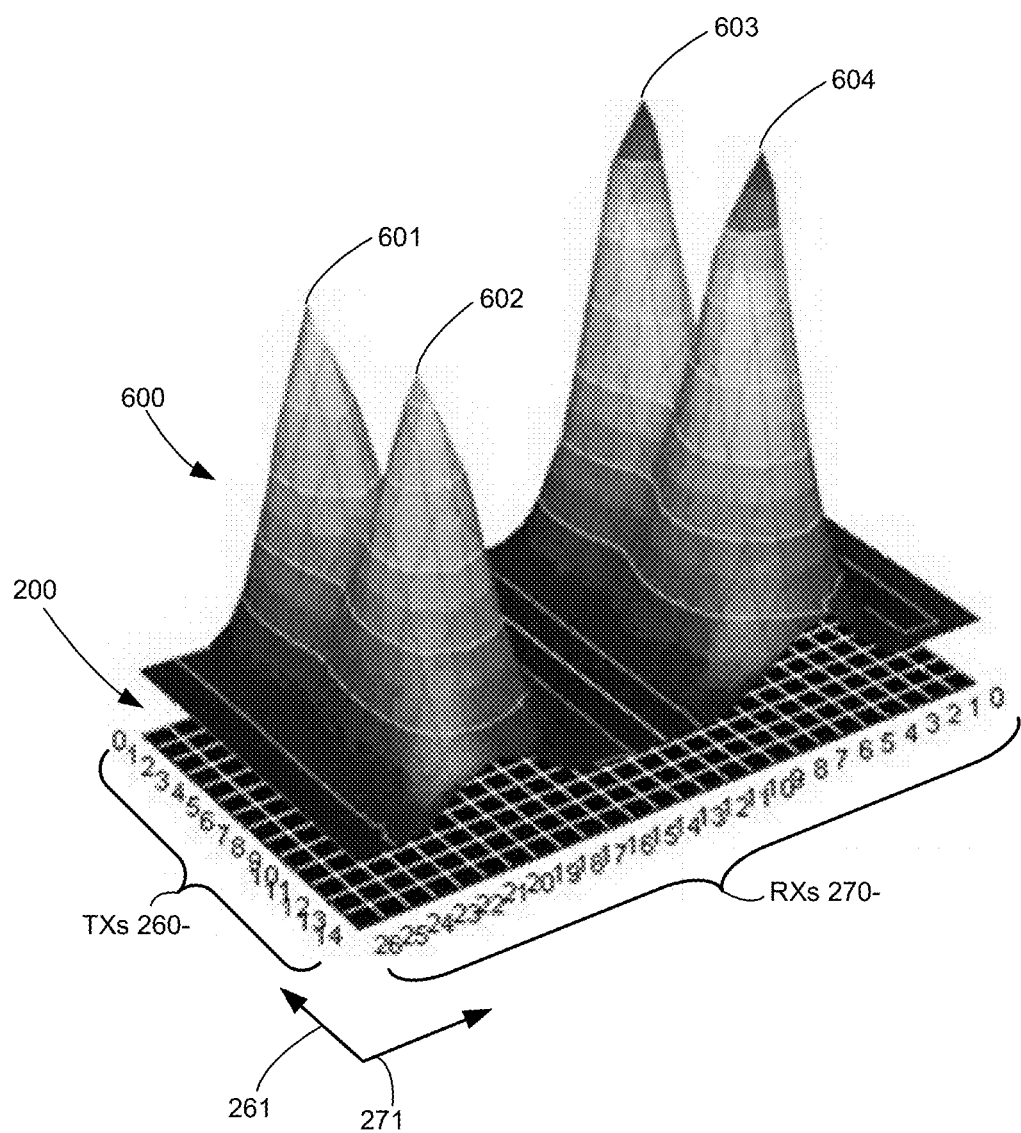
FIG. 6 shows perspective view of an example of a preprocessed absolute capacitive image, according to an embodiment.

FIG. 6 shows perspective view of an example of a preprocessed absolute capacitive image 600, according to an embodiment. In some embodiments, an absolute capacitive image such as absolute capacitive image 500 may be preprocessed before being used to determine a hybrid capacitive image. The preprocessing may include thresholding (e.g., values below a certain percentage of a peak value may be set to zero or some other value), Weiner filtering, weighting, and/or other preprocessing. For example, in one embodiment, squaring the values in absolute capacitive image 500 may be utilized to realize absolute capacitive image 600, which has sharpened peaks in comparison to absolute capacitive image 600.

Figure 7:
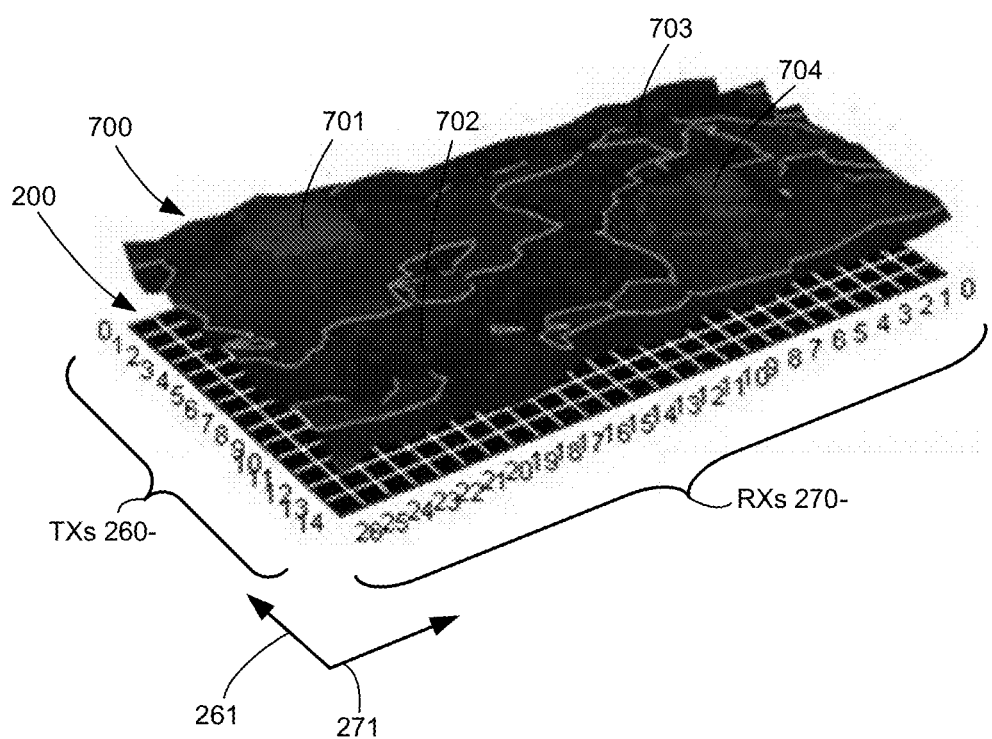
FIG. 7 shows a perspective view of an example of a transcapacitive image generated in response to input objects interacting with a sensor electrode pattern, according to an embodiment.

FIG. 7 shows a perspective view of an example of a transcapacitive image 700 generated in response to input objects interacting with a sensor electrode pattern, according to an embodiment. For example transcapacitive image 700 represents a transcapacitive image generated in response to the arrangement of input objects. In one embodiment, as illustrated, the arrangement of input objects may include one or more input objects, such as gloved digits 140C-1 and 140C-2 shown in FIG. 4, that are insulated from a sensor electrode pattern of a capacitive sensing input device. Although gloved digits are depicted, this depiction is by way of example and not of limitation and other types and/or combinations of types of input objects may exist in an arrangement of input objects. Although two input objects are illustrated, an arrangement of input objects may include a single input object or more than two input objects. In general, techniques for determining a transcapacitive image are well known in by those skilled in the capacitive sensing arts. As illustrated in FIG. 7, there are two small and barely perceptible peaks 701 and 704. These peaks may be very small due to the glove material preventing gloved digits 140C-1 and 140C-2 from causing much interaction with the transcapacitive couplings between sensor electrodes of the first and second pluralities of sensor electrodes in sensor electrode pattern 200. As can be seen other regions of transcapacitive image 700, such as 702 and 703 are fairly flat. In some embodiments, transcapacitive image 700 may be preprocessed by thresholding (e.g., values below a certain percentage of a peak value may be set to zero or some other value), weighting, filtering, or the like prior to being used to determine a hybrid capacitive image.

Figure 8:
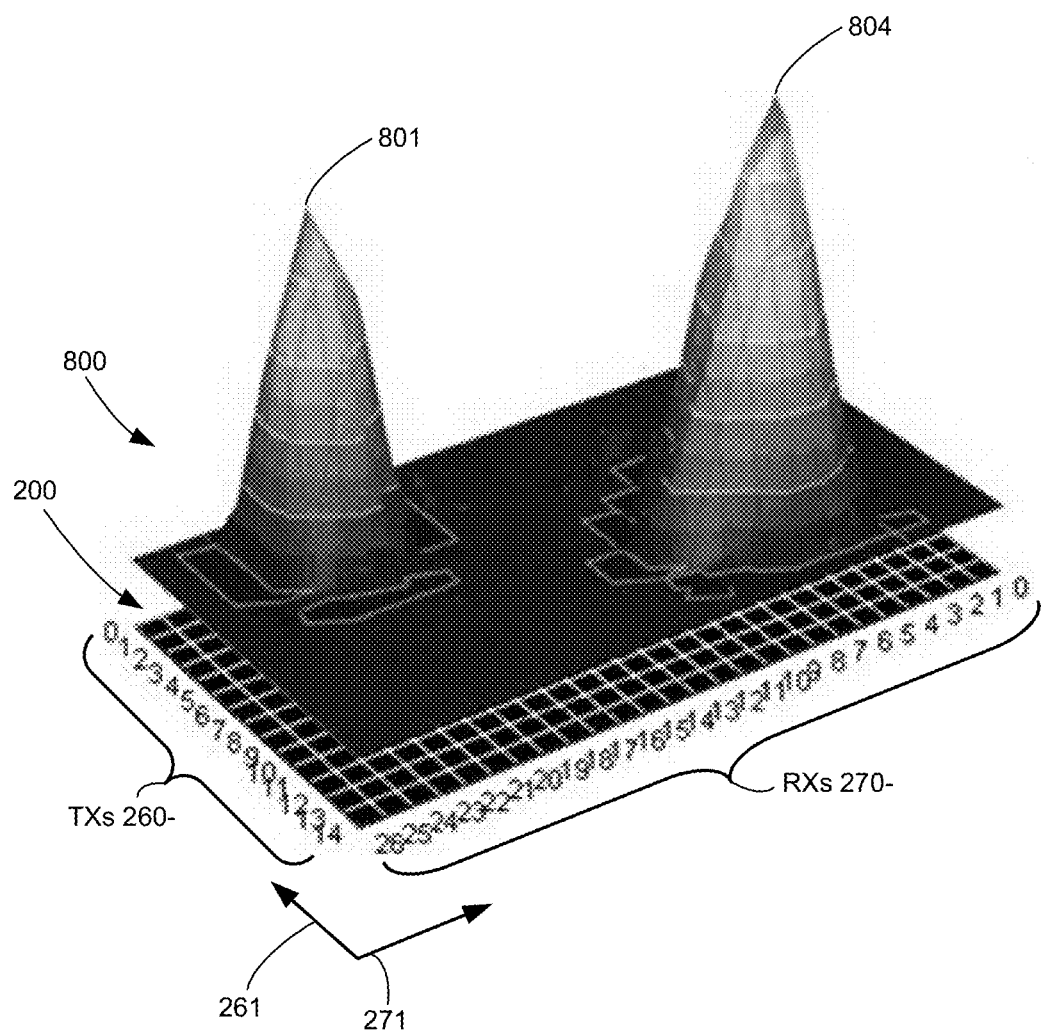
FIG. 8 shows a perspective view of an example hybrid capacitive image 800, according to various embodiments.

FIG. 8 shows a perspective view of an example hybrid capacitive image 800 generated, according to various embodiments. Such a hybrid capacitive image may be generated as a function of an absolute capacitive image and a transcapacitive image or may be generated on-the-fly on a per-pixel basis without generating an overall absolute capacitive image.

For example in one embodiment where an absolute capacitive image is separately generated, actual or preprocessed data from absolute capacitive image 500 and actual or preprocessed data from transcapacitive image 700 are utilized to determine hybrid capacitive image 800. Equation 3 shows one equation which may be utilized in some embodiments to determine capacitive pixel values of a hybrid capacitive image as a function of an absolute capacitive image and a transcapacitive image of input object(s).

$$\text{HybridImage}[x][y] = \text{TransImage}[x][y] * \text{AbsImage}[x][y] \quad \text{Equation 3}$$

Because noise in the absolute capacitive image that is convolved with the transcapacitive image by Equation 3 is not correlated it cancels out. For example, a zero value in a convolved capacitive pixel of either or both of absolute capacitive image 400 and transcapacitive image 700 becomes a zero value in a capacitive pixel of the convolved hybrid capacitive image (HybridImage). This results in a hybrid capacitive image that is very flat except for sharp peaks at the location of gloved digits 140C-1 and 140C-2.

It should be appreciated that there are various other techniques for combining capacitive pixel values from a transcapacitive image and an absolute capacitive image to active a hybrid capacitive image. For example, in addition to multiplying capacitive pixel values, as described by Equation 3, capacitive pixel values of an absolute capacitive image may be determined by a linear combination of the capacitive pixel values from a transcapacitive image and the capacitive pixel values of an absolute capacitive image using an equation such as Equation 4.

$$\text{HybridImage}[x][y] = \text{TransImage}[x][y] + \text{AbsImage}[x][y] \quad \text{Equation 4}$$

In general, determining positional information for an input object from a transcapacitive image is well known in the capacitive sensing arts. In one embodiment, determination module 320 accomplishes such position determination for transcapacitive images and applies similar techniques to input object position(s) from hybrid capacitive images. In some embodiments, when the same or similar algorithm is used by determination module 320 to evaluate both transcapacitive images and hybrid capacitive images for input object position determination, the values of capacitive pixel values associated with the hybrid capacitive image may be downwardly adjusted so that they reside in a range that is relatively the same as the range of capacitive pixel values of transcapacitive images that are analyzed for input object position determination. In one embodiment, the downward adjustment may be accomplished by scaling a hybrid capacitive image with a scale factor such that capacitive pixel values are in a range of transcapacitive images that are analyzed for input object position determination. In one embodiment, the downward adjustment may be accomplished by applying a root function (e.g., square root, cube root) to capacitive pixel values of a hybrid capacitive image such that capacitive pixel values are in a range of transcapacitive images that are analyzed for input object position determination.

In an on-the-fly per-pixel basis embodiment where an independent absolute capacitive image is not generated separately, actual or preprocessed data from absolute capacitive profiles (465, 475) and actual or preprocessed data from transcapacitive image 700 are utilized to determine hybrid capacitive image 800. Equations 5, 6, 7, and 8 show some equations which may be utilized in some embodiments to determine capacitive pixel values of a hybrid capacitive image as a function of two capacitive profiles and a transcapacitive image of input object(s).

HybridImage[*x*][*y*]=TransImage[*x*][*y*]*XAbsProfile
[*x*]*YAbsProfile[*y*]        Equation 5

HybridImage[*x*][*y*]=TransImage[*x*][*y*]+XAbsProfile
[*x*]*YAbsProfile[*y*]        Equation 6

HybridImage[*x*][*y*]=TransImage[*x*][*y*]+XAbsProfile
[*x*]+YAbsProfile[*y*]        Equation 7

HybridImage[*x*][*y*]=TransImage[*x*][*y*]*XAbsProfile
[*x*]+YAbsProfile[*y*]        Equation 8

Through the use of Equation 5, Equation 6, Equation 7, Equation 8, or other similar linear combination of pixel values, a hybrid image for all or some sub-portion of a sensing region is generated on a per-pixel basis by generating each pixel (HybridImage[x][y]). For example, in one embodiment, pixels values for TransImage[x][y] are taken from a transcapacitive image such as transcapacitive image 700 (these values may be used raw or may be preprocessed as has been previously described); pixel values for XAbsProfile[x] may be taken from an x-axis absolute capacitive profile such as absolute capacitive profile 465 (these values may be used raw or may be preprocessed as has been previously described; for example, the value of X may be 1 or some other value that greater than or less than 1 which is also greater than zero); and pixel values for YAbsProfile[y] may be taken from a y-axis absolute capacitive profile such as absolute capacitive profile 475 (these values may be used raw or may be preprocessed as has been previously described; for example, the value of Y may be 1 or some other value that greater than or less than 1 which is also greater than zero). The pixel values for a hybrid capacitive image that are achieved through the use of Equation 5, Equation 6, Equation 7, Equation 8, or the like may be downwardly adjusted, such as through the application of a scale factor or a root function such that values of the hybrid capacitive pixels are in a range of pixel values of transcapacitive images that are analyzed for input object position determination.

$$\Delta_h^2 = \sum_{i,j} \alpha_{ij}\Delta_i\Delta_j + \sum_i \beta_i\Delta_i \qquad \text{Equation 9}$$

Equation 9 represents a general form of the that encompasses the cases described in Equations 5-8, and allows for some weighting of values. In Equation 9, Delta_h is the hybrid image, i and j go from 0 to 2, Delta_0 is the transcapacitive image, Delta_1 is abs x, and Delta_2 is abs y. The alpha and beta coefficients are for relative weightings and optimally depend on the noise present in the deltas, but can be preset in some embodiments.

While the examples illustrated in FIGS. 4-8 concentrate on detecting multiple gloved human digits as input objects, it is appreciated that a hybrid capacitive image may be similarly utilized to detect a single gloved human digit or to detect input objects 140 such as a stylus 140A (or multiple styli), an ungloved human digit 140B (or multiple ungloved digits) in contact with and/or in proximity to the sensing device, and/or a combination of different types of input objects 140A, 140B, 140C, and the like in contact with and/or in proximity to the sensing device.

Example Methods of Operation

Figure 9B:
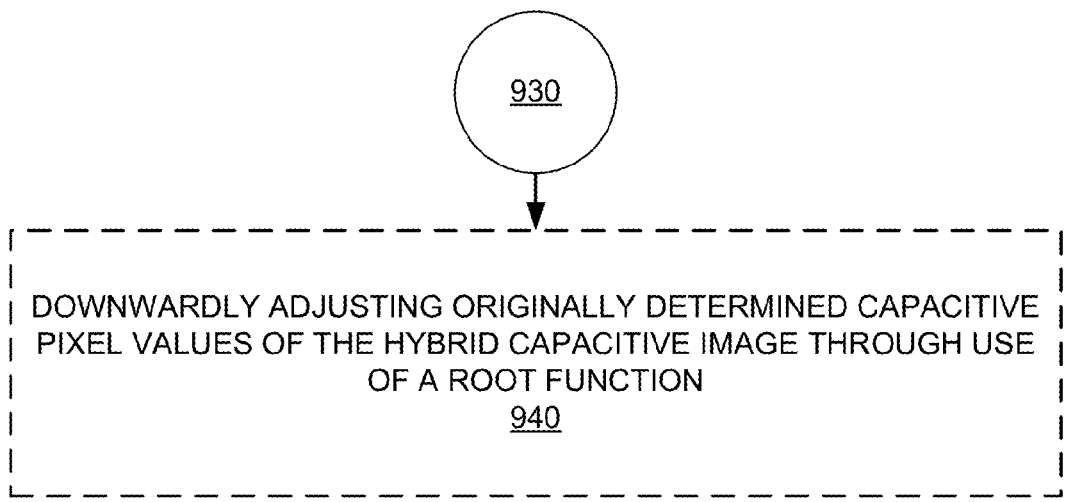

FIGS. 9A and 9B illustrate a method of determining a hybrid capacitive image, according to various embodiments. Procedures of this method will be described with reference to elements and/or components of one or more of FIGS. 1-8. It is appreciated that in some embodiments, the procedures may be performed in a different order than described, that some of the described procedures may not be performed, and/or that one or more additional procedures to those described may be performed.

With reference to FIG. 9A, at procedure 910 of flow diagram 900, in one embodiment, a transcapacitive image, a first absolute capacitive profile, and a second absolute capacitive profile are acquired with a plurality of sensor electrodes. In one embodiment, the transcapacitive image and the first and second absolute capacitive profiles are acquired by a processing system 110, such as processing system 110A, which is coupled with sensor electrodes of a capacitive sensor pattern (e.g., sensor electrodes 260 and 270 of sensor electrode pattern 200). For example, as previously described, processing system 110A may operate sensor electrode pattern, such as sensor electrode pattern 200 to acquire absolute capacitive profiles such as 465 and 475 and a transcapacitive image such as transcapacitive image 700. The transcapacitive image and first and second absolute capacitive profiles are acquired in close succession to one another, such as several milliseconds apart, such that they are essentially different representations of the same input object(s) at the same position(s) relative to a sensing region of a sensor electrode pattern of an input device.

At procedure 920 of flow diagram 900, in one embodiment, an absolute capacitive image is determined as a function of the first absolute capacitive profile and a second absolute capacitive profile. In one embodiment, the absolute capacitive image is determined by a processing system such as 110A from data originating from at least two absolute capacitive profiles along different axes of a sensor electrode pattern. Absolute capacitive image 500, as an example, is a function of absolute capacitive profiles 465 and 475. It is appreciated that all or a portion of the data from one or both of the first and second absolute capacitive profiles may be preprocessed such as by weighting it upward or downward from the original values, or by applying a threshold to delete or zero out certain values which do not meet a predetermined threshold. Various techniques may be utilized to combine data from the first absolute capacitive profile and the second absolute capacitive profile into an absolute capacitive image. In some embodiments, as described by Equation 1, actual or preprocessed data from the first absolute capacitive profile may be multiplied with actual or preprocessed data from the second capacitive profile to achieve capacitive pixel values of an absolute capacitive image. In some embodiments, as described by Equation 2, actual or preprocessed data from the first absolute capacitive profile may be linearly combined with actual or preprocessed data from the second capacitive profile to achieve capacitive pixel values of an absolute capacitive image.

At procedure 930 of flow diagram 900, in one embodiment, a hybrid capacitive image is determined as a function of the absolute capacitive image and the transcapacitive image. In one embodiment, the hybrid capacitive image is determined by a processing system such as 110A from data originating from an absolute capacitive image and a transcapacitive image. Hybrid capacitive image 800, as an example, is a function of absolute capacitive image 500 and transcapacitive image 700. It is appreciated that all or a portion of the capacitive pixel values from one or both of the absolute capacitive image and the transcapacitive image may be preprocessed such as by weighting, scaling, or by applying a threshold to delete or zero out certain values which do not meet a predetermined threshold. Various techniques may be utilized to convolve capacitive pixel values from the absolute capacitive image and capacitive pixel values from the transcapacitive image to capacitive pixel values of the hybrid capacitive image. In some embodiments, as described by Equation 3, actual or preprocessed capacitive pixel values from the absolute capacitive image may be multiplied with actual or preprocessed capacitive pixel values from the transcapacitive image to achieve capacitive pixel values of the hybrid capacitive image. In some embodiments, as described by Equation 4, actual or preprocessed capacitive pixel values from the absolute capacitive image may be linearly combined with actual or preprocessed capacitive pixel values from the transcapacitive image to achieve capacitive pixel values of the hybrid capacitive image. The hybrid capacitive image may be generated in this fashion for all or some sub-portion of a sensing region associated with a sensor electrode pattern.

It should be appreciated that a processing system 110, such as processing system 110A, can determine positions of one or more input objects in a sensing region 120 from the hybrid capacitive image. The input objects for which the positions are determined may be one or some combination of styli, ungloved human digits (e.g., bare skin), or gloved human digits.

With reference to FIG. 9B, at procedure 940 of flow diagram 900, in one embodiment, the method as described in 910-930 further includes downwardly adjusting originally determined capacitive pixel values of the hybrid capacitive image through use of a root function. For example, in one embodiment, a square root may be applied to some or all originally determined capacitive pixel values (e.g., as originally determined in procedure 930) in a hybrid capacitive image to downwardly adjust them. In one embodiment, a processing system 110, such as processing system 110A, performs this or other types of downward adjustment on capacitive pixel values of a hybrid capacitive image such that the adjusted pixel values are within a range of upper and lower bounds associated with analytical capability of processing system 110 or else are similar in upper and lower bounds to pixel values of a transcapacitive image that has been utilized in the determination of the hybrid capacitive image. As an alternative to use of a root function, a scaling factor may be utilized to perform the downward adjustment in some embodiments.

Figure 10B:
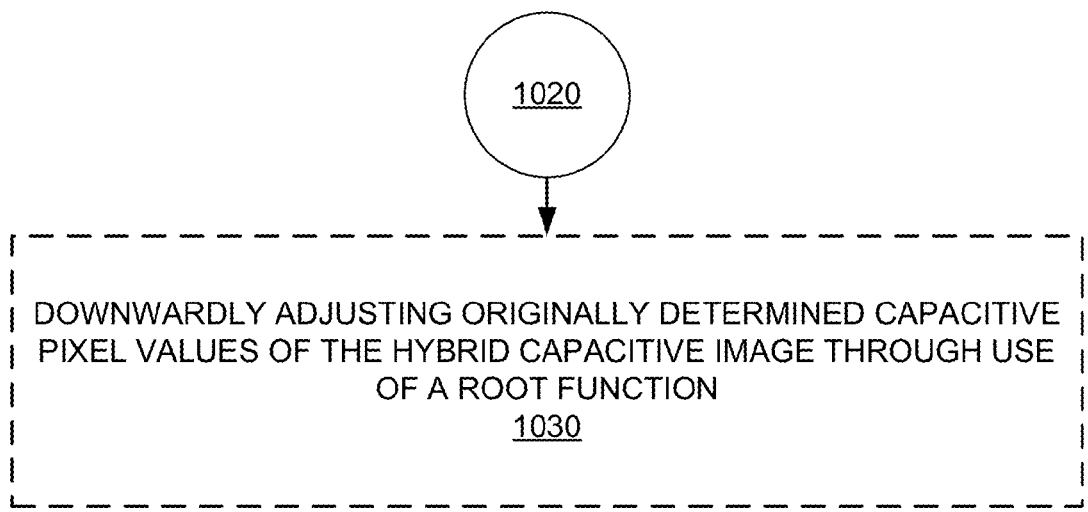

FIGS. 10A and 10B illustrate a method of determining a hybrid capacitive image, according to various embodiments. Procedures of this method will be described with reference to elements and/or components of one or more of FIGS. 1-4 and 7-8. It is appreciated that in some embodiments, the procedures may be performed in a different order than described, that some of the described procedures may not be performed, and/or that one or more additional procedures to those described may be performed.

With reference to FIG. 10A, at procedure 1010 of flow diagram 1000, in one embodiment, a transcapacitive image, a first absolute capacitive profile, and a second absolute capacitive profile are acquired with a plurality of sensor electrodes. In one embodiment, the transcapacitive image and the first and second absolute capacitive profiles are acquired by a processing system 110, such as processing system 110A, which is coupled with sensor electrodes of a capacitive sensor pattern (e.g., sensor electrodes 260 and 270 of sensor electrode pattern 200). For example, as previously described, processing system 110A may operate sensor electrode pattern, such as sensor electrode pattern 200 to acquire absolute capacitive profiles such as 465 and 475 and a transcapacitive image such as transcapacitive image 700. The transcapacitive image and first and second absolute capacitive profiles are acquired in close succession to one another, such as several milliseconds apart, such that they are essentially different representations of the same input object(s) at the same position(s) relative to a sensing region of a sensor electrode pattern of an input device.

At procedure 1020 of flow diagram 1000, in one embodiment, a hybrid capacitive image is determined as a function of the first absolute capacitive profile, the second absolute capacitive profile, and the transcapacitive image. In one embodiment, the hybrid capacitive image is determined by a processing system 110, such as processing system 110A, from data originating from the transcapacitive image, the first absolute capacitive profile, and the second absolute capacitive profile. Hybrid capacitive image 800, as an example, is a function of absolute capacitive profile 465, absolute capacitive profile 475, and transcapacitive image 700. It is appreciated that all or a portion of the capacitive pixel values from one or both of the absolute capacitive image and the transcapacitive image may be preprocessed such as by weighting, scaling, or the like. Various techniques may be utilized to convolve capacitive pixel values from the first absolute capacitive profile, capacitive pixel values from the second absolute capacitive profile, and capacitive pixel values from the transcapacitive image into capacitive pixel values of the hybrid capacitive image. In some embodiments, as described by Equations 5-8, actual or preprocessed capacitive pixel values from the first and second absolute capacitive profiles and actual or preprocessed capacitive pixel values from the transcapacitive image are linearly combined to achieve capacitive pixel values of the hybrid capacitive image. The hybrid capacitive image may be generated in this fashion for all or some sub-portion of a sensing region associated with a sensor electrode pattern.

It should be appreciated that a processing system 110, such as processing system 110A, can determine positions of one or more input objects in a sensing region 120 from the hybrid capacitive image. The input objects for which the positions are determined may be one or some combination of styli, ungloved human digits (e.g., bare skin), or gloved human digits.

With reference to FIG. 10B, at procedure 1030 of flow diagram 1000, in one embodiment, the method as described in 1010-1020 further includes downwardly adjusting originally determined capacitive pixel values of the hybrid capacitive image through use of a root function (e.g., square root, cube root, or the like). For example, in one embodiment, a square root may be applied to some or all originally determined capacitive pixel values (e.g., as originally determined in procedure 1020) in a hybrid capacitive image to downwardly adjust them. In one embodiment, a processing system 110, such as processing system 110A, performs this or other types of downward adjustment on capacitive pixel values of a hybrid capacitive image such that the adjusted pixel values are within a range of upper and lower bounds associated with analytical capability of processing system 110 or else are similar in upper and lower bounds to pixel values of a transcapacitive image that has been utilized in the determination of the hybrid capacitive image. As an alternative to use of a root function, a scaling factor may be utilized to perform the downward adjustment in some embodiments.

Figure 11B:
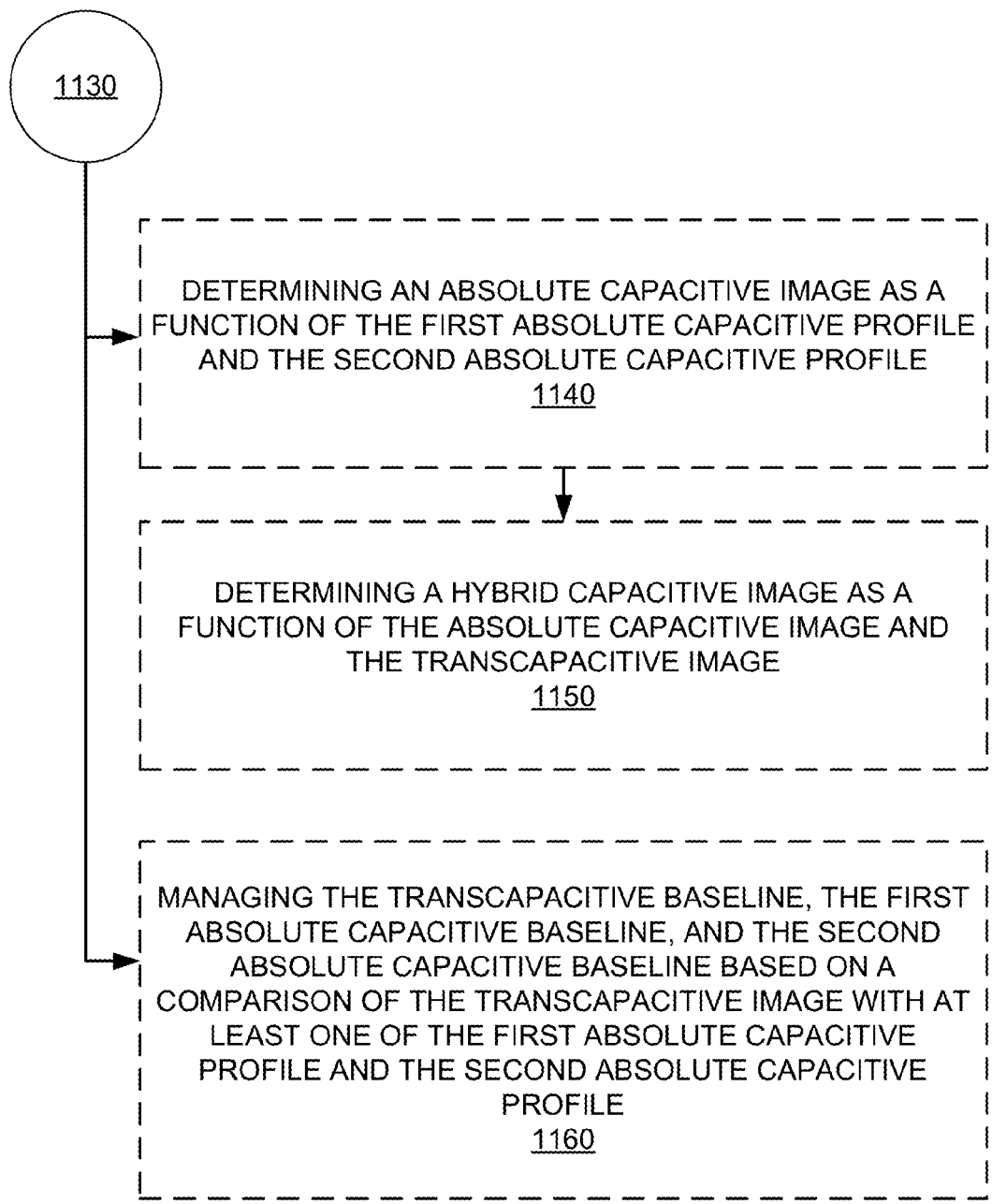

FIGS. 11A and 11B illustrate a method of determining a hybrid capacitive image, according to various embodiments. Procedures of this method will be described with reference to elements and/or components of one or more of FIGS. 1-8.

It is appreciated that in some embodiments, the procedures may be performed in a different order than described, that some of the described procedures may not be performed, and/or that one or more additional procedures to those described may be performed.

With reference to FIG. 11A, at procedure 1110 of flow diagram 1100, in one embodiment, a transcapacitive baseline, a first absolute capacitive baseline, and a second absolute capacitive baseline are acquired with a plurality of sensor electrodes of the capacitive sensing input device. In one embodiment, the transcapacitive baseline and the first and second absolute capacitive baselines are acquired by a processing system 110, such as processing system 110B, which is coupled with sensor electrodes of a capacitive sensor pattern (e.g., sensor electrodes 260 and 270 of sensor electrode pattern 200) of a cap active sensing input device (e.g., input device 100). For example, as previously described, processing system 110B may operate a sensor electrode pattern, such as sensor electrode pattern 200 to acquire absolute capacitive profiles such as 465 and 475 and a transcapacitive image such as transcapacitive image 700, and the acquired profiles and transcapacitive image may be stored as baselines. The transcapacitive image and first and second absolute capacitive profiles are acquired in close succession to one another, such as several milliseconds apart, such that they are essentially different representations of the same baseline state of a sensing region of a sensor electrode pattern of an input device.

At procedure 1120 of flow diagram 1100, in one embodiment, a transcapacitive image, a first absolute capacitive profile, and a second absolute capacitive profile are acquired with the plurality of sensor electrodes. In one embodiment, after acquisition of the baselines, the transcapacitive image and the first and second absolute capacitive profiles are acquired by a processing system 110, such as processing system 110B, which is coupled with sensor electrodes of a capacitive sensor pattern (e.g., sensor electrodes 260 and 270 of sensor electrode pattern 200). For example, as previously described, processing system 110B may operate sensor electrode pattern, such as sensor electrode pattern 200 to acquire absolute capacitive profiles such as 465 and 475 and a transcapacitive image such as transcapacitive image 700. The transcapacitive image and first and second absolute capacitive profiles are acquired in close succession to one another, such as several milliseconds apart, such that they are essentially different representations of the same input object(s) at the same position(s) relative to a sensing region of a sensor electrode pattern of an input device.

At procedure 1130 of flow diagram 1100, in one embodiment, the transcapacitive baseline, the first absolute capacitive baseline, and the second absolute capacitive baseline are managed based on a value of at least one of the first absolute capacitive profile and the second absolute capacitive profile. The management occurs on a frame by frame basis for acquisition of capacitive frames that include a transcapacitive image and the first and second absolute capacitive profiles. For example, this can include baseline management module 330 using values in the first and second capacitive profiles to perform one or more of the negativity checks that are described herein. Based on the results of the negativity checks, baseline management module 330 directs management actions (which can include various types of updates) to all of the baselines, and processing system 110B carries out the management actions. As described above, in various embodiments, the management action that is directed to be carried out can include: performing fast relaxation on the transcapacitive baseline, the first absolute capacitive baseline, and the second absolute capacitive baseline; performing slow relaxation on the transcapacitive baseline, the first absolute capacitive baseline, and the second absolute capacitive baseline; acquiring a new transcapacitive baseline, a new absolute capacitive baseline, and a new second absolute capacitive baseline; or freezing (not changing in any way) the transcapacitive baseline, the first absolute capacitive baseline, and the second absolute capacitive baseline. Like management actions are directed and then performed in lock-step to all of the baselines; for example, if one baseline is reacquired all are reacquired.

At procedure 1140 of flow diagram 1100, in one embodiment, the method as described in 1110-1130 further includes determining an absolute capacitive image as a function of the first absolute capacitive profile and a second absolute capacitive profile. In one embodiment, the absolute capacitive image is determined by a processing system such as 110B from data originating from at least two absolute capacitive profiles along different axes of a sensor electrode pattern. Absolute capacitive image 500, as an example, is a function of absolute capacitive profiles 465 and 475. It is appreciated that all or a portion of the data from one or both of the first and second absolute capacitive profiles may be preprocessed such as by weighting it upward or downward from the original values, or by applying a threshold to delete or zero out certain values which do not meet a predetermined threshold. Various techniques may be utilized to combine data from the first absolute capacitive profile and the second absolute capacitive profile into an absolute capacitive image. In some embodiments, as described by Equation 1, actual or preprocessed data from the first absolute capacitive profile may be multiplied with actual or preprocessed data from the second capacitive profile to achieve capacitive pixel values of an absolute capacitive image. In some embodiments, as described by Equation 2, actual or preprocessed data from the first absolute capacitive profile may be linearly combined with actual or preprocessed data from the second capacitive profile to achieve capacitive pixel values of an absolute capacitive image.

At procedure 1150 of flow diagram 1100, in one embodiment, the method as described in 1110-1130 further includes, determining a hybrid capacitive image as a function of the absolute capacitive image and the transcapacitive image. In one embodiment, the hybrid capacitive image is determined by a processing system such as 110B from data originating from an absolute capacitive image and a transcapacitive image. Hybrid capacitive image 800, as an example, is a function of absolute capacitive image 500 and transcapacitive image 700. It is appreciated that all or a portion of the capacitive pixel values from one or both of the absolute capacitive image and the transcapacitive image may be preprocessed such as by weighting, scaling, or by applying a threshold to delete or zero out certain values which do not meet a predetermined threshold. Various techniques may be utilized to convolve capacitive pixel values from the absolute capacitive image and capacitive pixel values from the transcapacitive image into capacitive pixel values of the hybrid capacitive image. In some embodiments, as described by Equation 3, actual or preprocessed capacitive pixel values from the absolute capacitive image may be multiplied with actual or preprocessed capacitive pixel values from the transcapacitive image to achieve capacitive pixel values of the hybrid capacitive image. In some embodiments, as described by Equation 4, actual or preprocessed capacitive pixel values from the absolute capacitive image may be linearly combined with actual or preprocessed capacitive pixel values from the transcapacitive image to achieve capacitive pixel values of the hybrid capacitive image. The hybrid capacitive image may be generated in this fashion for all or some sub-portion of a sensing region associated with a sensor electrode pattern.

It should be appreciated that a processing system 110, such as processing system 110B, can determine positions of one or more input objects in a sensing region 120 from the hybrid capacitive image. The input objects for which the positions are determined may be one or some combination of styli, ungloved human digits (e.g., bare skin), or gloved human digits.

With reference to FIG. 11B, at procedure 1160 of flow diagram 1100, in one embodiment, the method as described in 1110-1130 further includes managing the transcapacitive baseline, the first absolute capacitive baseline, and the second absolute capacitive baseline based on a comparison of the transcapacitive image with at least one of the first absolute capacitive profile and the second absolute capacitive profile. For example, this can include baseline management module 330 using values in the first and second capacitive profiles to perform one the peak value checks that are described herein where locations with peak values in the transcapacitive delta between the transcapacitive image and the transcapacitive baseline are compared to corresponding locations in each of the absolute capacitive deltas. Based on the results of the peak value checks, baseline management module 330 directs management actions (which can include various types of updates) to all of the baselines, and processing system 110B carries out the management actions. As described above, in various embodiments, the management action that is directed to be carried out can include: performing fast relaxation on the transcapacitive baseline, the first absolute capacitive baseline, and the second absolute capacitive baseline; performing slow relaxation on the transcapacitive baseline, the first absolute capacitive baseline, and the second absolute capacitive baseline; acquiring a new transcapacitive baseline, a new absolute capacitive baseline, and a new second absolute capacitive baseline; or freezing (not changing in any way) the transcapacitive baseline, the first absolute capacitive baseline, and the second absolute capacitive baseline. Like management actions are directed and then performed in lock-step to all of the baselines; for example, if one baseline is fast relaxed all are fast relaxed. In one embodiment, this comprises updating the transcapacitive baseline, the first absolute capacitive baseline, and the second absolute capacitive baseline based on the peak value check resulting in detection of an input object in the transcapacitive image but not both of the first absolute capacitive profile and the second absolute capacitive profile. For example, if the peak does not occur at corresponding locations in in both the first and second absolute capacitive profiles, then an error is indicated. This update may be involve a reacquisition of transcapacitive baseline and the absolute capacitive baselines. In one embodiment, if input objects are detected by the peak value checks and no errors are noted in the peak value checks (e.g., peaks appear at corresponding locations in all three of transcapacitive image and the first and second absolute capacitive profiles), baseline management module 330 directs freezing the transcapacitive baseline, the absolute capacitive baseline, and the second absolute capacitive baseline, and processing system 110B carries out this freezing.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A method of managing baselines of a capacitive sensing input device, said method comprising:
   acquiring a transcapacitive baseline, a first absolute capacitive baseline, and a second absolute capacitive baseline with a plurality of sensor electrodes of the capacitive sensing input device;
   acquiring a transcapacitive image with said plurality of sensor electrodes, a first absolute capacitive profile with a first subset of sensor electrodes of said plurality of sensor electrodes, and a second absolute capacitive profile with a second subset of sensor electrodes of said plurality of sensor electrodes, wherein sensor electrodes of said first subset are different from sensor electrodes of said second subset;
   determining an absolute capacitive image as a function of said first absolute capacitive profile and said second absolute capacitive profile;
   determining a hybrid capacitive image as a function of said absolute capacitive image and said transcapacitive image; and
   managing said transcapacitive baseline, said first absolute capacitive baseline, and said second absolute capacitive baseline based on a value of at least one of said first absolute capacitive profile and said second absolute capacitive profile.

2. The method as recited in claim 1, further comprising:
   managing said transcapacitive baseline, said first absolute capacitive baseline, and said second absolute capacitive baseline based on a comparison of said transcapacitive image with at least one of said first absolute capacitive profile and said second absolute capacitive profile.

3. The method as recited in claim 2, wherein said managing said transcapacitive baseline, said first absolute capacitive baseline, and said second absolute capacitive baseline based on a comparison of said transcapacitive image with at least one of said first absolute capacitive profile and said second absolute capacitive profile comprises:
   updating said transcapacitive baseline, said first absolute capacitive baseline, and said second absolute capacitive baseline based on detection of an input object in one of said transcapacitive image but not in both of said first absolute capacitive profile and said second absolute capacitive profile.

4. The method as recited in claim 2, wherein said managing said transcapacitive baseline, said first absolute capacitive baseline, and said second absolute capacitive baseline based on a comparison of said transcapacitive image with at least one of said first absolute capacitive profile and said second absolute capacitive profile comprises:
   freezing said transcapacitive baseline, said absolute capacitive baseline, and said second absolute capacitive baseline.

5. The method as recited in claim 1, wherein said managing said transcapacitive baseline, said first absolute capacitive baseline, and said second absolute capacitive baseline based on a value of at least one of said first absolute capacitive profile and said second absolute capacitive profile comprises:

updating said transcapacitive baseline, said first absolute capacitive baseline, and said second absolute capacitive baseline when said value based on negativity of the value.

6. The method as recited in claim 1, wherein said managing said transcapacitive baseline, said first absolute capacitive baseline, and said second absolute capacitive baseline based on a value of at least one of said first absolute capacitive profile and said second absolute capacitive profile comprises:
performing slow relaxation on said transcapacitive baseline, said first absolute capacitive baseline, and said second absolute capacitive baseline.

7. The method as recited in claim 1, wherein said managing said transcapacitive baseline, said first absolute capacitive baseline, and said second absolute capacitive baseline based on a value of at least one of said first absolute capacitive profile and said second absolute capacitive profile comprises:
performing fast relaxation on said transcapacitive baseline, said first absolute capacitive baseline, and said second absolute capacitive baseline.

8. The method as recited in claim 1, wherein managing said transcapacitive baseline, said first absolute capacitive baseline, and said second absolute capacitive baseline based on a value of at least one of said first absolute capacitive profile and said second absolute capacitive profile comprises:
acquiring a new transcapacitive baseline, a new absolute capacitive baseline, and a new second absolute capacitive baseline.

9. A processing system for a capacitive sensing input device, said processing system comprising:
a sensor module configured to acquire transcapacitive resulting signals by transmitting with a first one of a plurality of sensor electrodes and receiving with a second one of said plurality of sensor electrodes and acquire absolute capacitive resulting signals by modulating and receiving with a first subset of sensor electrodes of said plurality of sensor electrodes that include said first one of said plurality of sensor electrodes and modulating and receiving with a second subset of sensor electrodes of said plurality of sensor electrodes that include said second one of said plurality of sensor electrodes, wherein sensor electrodes of said first subset are different from sensor electrodes of said second subset;
a determination module configured to:
determine a transcapacitive image from said transcapacitive resulting signals; and
determine a first absolute capacitive profile and a second absolute capacitive profile from said absolute capacitive resulting signals;
determine an absolute capacitive image as a function of said first absolute capacitive profile and said second absolute capacitive profile;
determine a hybrid capacitive image as a function of said absolute capacitive image and said transcapacitive image; and
a baseline management module configured to utilize said transcapacitive image, said first absolute capacitive profile, and said second absolute capacitive profile to manage a transcapacitive baseline associated with said capacitive sensing input device, a first absolute capacitive baseline associated with said capacitive sensing input device, and a second absolute capacitive baseline associated with said capacitive sensing input device.

10. The processing system of claim 9, wherein said baseline management module is further configured to:
manage said transcapacitive baseline, said first absolute capacitive baseline, and said second absolute capacitive baseline based on a comparison of said transcapacitive image with at least one of said first absolute capacitive profile and said second absolute capacitive profile.

11. The processing system of claim 10, wherein said baseline management module is further configured to:
manage said transcapacitive baseline, said first absolute capacitive baseline, and said second absolute capacitive baseline based on detection of an input object in one of said transcapacitive image but not in both of said first absolute capacitive profile and said second absolute capacitive profile.

12. The processing system of claim 10, wherein said management of said transcapacitive baseline, said first absolute capacitive baseline, and said second absolute capacitive baseline based on detection of an input object comprises:
applying a like management action to each of said transcapacitive baseline, said first absolute capacitive baseline, and said second absolute capacitive baseline, wherein said like management action is selected from the list of management actions consisting of fast relaxation, slow relaxation, freezing, and reacquisition.

13. The processing system of claim 9, wherein said baseline management module is further configured to:
manage said transcapacitive baseline, said first absolute capacitive baseline, and said second absolute capacitive baseline based on a value of at least one of said first absolute capacitive profile and said second absolute capacitive profile.

14. The processing system of claim 13, wherein said management of said transcapacitive baseline, said first absolute capacitive baseline, and said second absolute capacitive baseline based on a value of at least one of said first absolute capacitive profile and said second absolute capacitive profile comprises:
applying a like management action to each of said transcapacitive baseline, said first absolute capacitive baseline, and said second absolute capacitive baseline, wherein said like management action is selected from the list of management actions consisting of fast relaxation, slow relaxation, freezing, and reacquisition.

15. A capacitive sensing input device, said capacitive sensing input device comprising:
a plurality of sensor electrodes; and
a processing system coupled with said plurality of sensor electrodes, said processing system configured to:
acquire transcapacitive resulting signals by transmitting with a first one of said plurality of sensor electrodes and receiving with a second one of said plurality of sensor electrodes and acquire absolute capacitive resulting signals by modulating and receiving with a first subset of sensor electrodes of said plurality of sensor electrodes that include said first one of said plurality of sensor electrodes and modulating and receiving with a second subset of sensor electrodes of said plurality of sensor electrodes that include said second one of said plurality of sensor electrodes, wherein sensor electrodes of said first subset are different from sensor electrodes of said second subset;

determine a transcapacitive image from said transcapacitive resulting signals;

determine a first absolute capacitive profile and a second absolute capacitive profile from said absolute capacitive resulting signals;

determine an absolute capacitive image as a function of said first absolute capacitive profile and said second absolute capacitive profile;

determine a hybrid capacitive image as a function of said absolute capacitive image and said transcapacitive image; and utilize said transcapacitive image, said first absolute capacitive profile, and said second absolute capacitive profile to manage a transcapacitive baseline associated with said capacitive sensing input device, a first absolute capacitive baseline associated with said capacitive sensing input device, and a second absolute capacitive baseline associated with said capacitive sensing input device.

16. The capacitive sensing input device of claim 15, wherein said processing system is further configured to:

manage said transcapacitive baseline, said first absolute capacitive baseline, and said second absolute capacitive baseline based on a comparison of said transcapacitive image with at least one of said first absolute capacitive profile and said second absolute capacitive profile.

17. The capacitive sensing input device of claim 16, wherein said processing system is further configured to:

manage said transcapacitive baseline, said first absolute capacitive baseline, and said second absolute capacitive baseline based on a value of at least one of said first absolute capacitive profile and said second absolute capacitive profile.

18. The capacitive sensing input device of claim 17, wherein said processing system is further configured to:

apply a like management action to each of said transcapacitive baseline, said first absolute capacitive baseline, and said second absolute capacitive baseline, wherein said like management action is selected from the list of management actions consisting of fast relaxation, slow relaxation, freezing, and reacquisition.

* * * * *